(12) United States Patent
Fujii et al.

(10) Patent No.: US 8,400,401 B2
(45) Date of Patent: Mar. 19, 2013

(54) OPERATING DEVICE AND IMAGE FORMING APPARATUS

(75) Inventors: Shuhji Fujii, Kyoto (JP); Yuji Okamoto, Kyoto (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 642 days.

(21) Appl. No.: 12/384,195

(22) Filed: Apr. 1, 2009

(65) Prior Publication Data

US 2009/0251416 A1 Oct. 8, 2009

(30) Foreign Application Priority Data

Apr. 2, 2008 (JP) ................................. 2008-096463

(51) Int. Cl.
*G06F 3/02* (2006.01)
(52) U.S. Cl. ......... 345/168; 345/169; 345/170; 345/171
(58) Field of Classification Search .......... 345/168–179, 345/442; 358/520, 1.13–1.19, 1.5; 455/566; 715/784, 835, 703, 780; 713/2; 704/8
See application file for complete search history.

(56) References Cited

U.S. PATENT DOCUMENTS

| | | | | |
|---|---|---|---|---|
| 4,321,597 A * | 3/1982 | Martin | ............................ | 345/17 |
| 4,689,604 A * | 8/1987 | Sokol | ............................ | 345/31 |
| 4,918,723 A * | 4/1990 | Iggulden et al. | ......... | 379/100.17 |
| 5,038,401 A * | 8/1991 | Inotsume | ........................ | 455/92 |
| 5,526,268 A * | 6/1996 | Tkacs et al. | ....................... | 704/8 |
| 5,624,473 A * | 4/1997 | Farkas et al. | ..................... | 65/158 |
| 5,680,520 A * | 10/1997 | Watanabe et al. | ............. | 345/471 |
| 5,726,779 A * | 3/1998 | Kadowaki et al. | ............ | 358/520 |
| 5,847,697 A * | 12/1998 | Sugimoto | ..................... | 345/168 |
| 6,454,649 B1 * | 9/2002 | Mattice et al. | ................... | 463/17 |
| 7,546,602 B2 * | 6/2009 | Hejlsberg et al. | ............. | 719/313 |
| 2004/0145762 A1 * | 7/2004 | Kurashina | .................... | 358/1.11 |
| 2004/0239973 A1 * | 12/2004 | Tanaka et al. | ................. | 358/1.13 |
| 2005/0061638 A1 * | 3/2005 | Sugimura et al. | ............. | 200/5 A |
| 2005/0063757 A1 * | 3/2005 | Sugimura et al. | ............. | 400/472 |

(Continued)

FOREIGN PATENT DOCUMENTS

| | | |
|---|---|---|
| CN | 20051066818 | 4/2005 |
| CN | 1689826 | 11/2005 |

(Continued)

OTHER PUBLICATIONS

TDB-ACC-No. NA840643 Disclosure Title: Touch-Sensitive Screen Proximate and Electronically Composable Display Publication-Data: IBM Technical Disclosure Bulletin, Jun. 1984, US vol. 27 Issue No. 1A p. 43-44 Publication-Date: Jun. 1, 1984 Cross Reference: 0018-8689-27-1A-43.*

(Continued)

*Primary Examiner* — Prabodh M Dharia
(74) *Attorney, Agent, or Firm* — Edwards Wildman Palmer LLP; David G. Conlin; George W. Neuner

(57) ABSTRACT

An operating device for controlling an apparatus as an object of control, in accordance with an instruction by a user includes a panel having a main surface, a hardware key provided on the main surface, and a display unit formed of electronic paper, provided in relation to the hardware key on the main surface of the panel or on the hardware key, allowing rewriting of displayed contents.

18 Claims, 25 Drawing Sheets

| USER ID | PASSWORD | LANGUAGE TABLE | KEY FUNCTION CORRESPONDENCE TABLE | CHARACTER SEQUENCE TABLE | | | |
|---|---|---|---|---|---|---|---|
| 1170001 | * * * * | LANGUAGE TABLE 1 | KEY FUNCTION CORRESPONDENCE TABLE 1 | CHARACTER SEQUENCE TABLE 1-1 | CHARACTER SEQUENCE TABLE 1-2 | CHARACTER SEQUENCE TABLE 1-3 | . . |
| 1170002 | * * * * * | LANGUAGE TABLE 2 | KEY FUNCTION CORRESPONDENCE TABLE 2 | CHARACTER SEQUENCE TABLE 2-1 | CHARACTER SEQUENCE TABLE 2-2 | | . . |
| : | : | : | : | : | : | : | : |

670

U.S. PATENT DOCUMENTS

| | | | |
|---|---|---|---|
| 2005/0129199 A1* | 6/2005 | Abe | 379/90.01 |
| 2005/0187755 A1* | 8/2005 | Jurion et al. | 704/4 |
| 2005/0219218 A1* | 10/2005 | Harman | 345/169 |
| 2005/0240756 A1* | 10/2005 | Mayer | 713/2 |
| 2006/0227343 A1 | 10/2006 | Yamaguchi | |
| 2007/0043632 A1* | 2/2007 | Abelow | 705/27 |
| 2007/0124675 A1* | 5/2007 | Ban et al. | 715/703 |
| 2007/0128899 A1* | 6/2007 | Mayer | 439/152 |
| 2007/0201074 A1* | 8/2007 | Tashiro et al. | 358/1.13 |
| 2007/0209016 A1* | 9/2007 | Takayama et al. | 715/780 |
| 2007/0273648 A1* | 11/2007 | Fussinger | 345/161 |
| 2008/0177994 A1* | 7/2008 | Mayer | 713/2 |
| 2010/0070345 A1* | 3/2010 | Abelow | 705/10 |

FOREIGN PATENT DOCUMENTS

| | | |
|---|---|---|
| CN | 200610006043.6 | 10/2006 |
| JP | 8-293224 | 11/1996 |
| JP | 2003-209718 | 7/2003 |
| JP | 2005-149605 | 6/2005 |
| JP | 2005-227899 | 8/2005 |
| JP | 2005-313332 | 11/2005 |
| JP | 2006-71411 | 3/2006 |
| JP | 2006-191548 | 7/2006 |
| JP | 2008-33631 | 2/2008 |
| JP | 2008-47018 | 2/2008 |

OTHER PUBLICATIONS

TDB-ACC-No. NA9103369 Disclosure Title: Keyboard. Publication-Data: IBM Technical Disclosure Bulletin, Mar. 1991, US vol. 33 Issue No. 10A p. 369-370 Publication-Date: Mar. 1, 1991 Cross Reference: 0018-8689-33-10A-369.*

TDB-ACC-No. NN9012229 Disclosure Title: Forward and Backward Edge Trigger Entry Fields. Publication-Data: IBM Technical Disclosure Bulletin, Dec. 1990, US vol. 33 Issue No. 7 p. 229-230 Publication-Date: Dec. 1, 1990 Cross Reference: 0018-8689-33-7-229.*

* cited by examiner

| KEY NUMBER | FUNCTION NUMBER |
|---|---|
| 1 | 11 |
| 2 | 5 |
| ⋮ | ⋮ |
|  |  |
|  |  |

| GROUP NUMBER | KEY NUMBER |
|---|---|
| 1 | 11 |
|   | : |
|   | 5 |
| 2 | 2 |
|   | : |
|   | 4 |
| 3 | 15 |
|   | : |
|   | 3 |

OPERATING DEVICE AND IMAGE FORMING APPARATUS

CROSS-REFERENCE TO RELATED APPLICATION

This nonprovisional application claims priority under 35 U.S.C. §119(a) on Patent Application No. 2008-096463 filed in Japan on Apr. 2, 2008, the entire contents of which are hereby incorporated by reference.

BACKGROUND OF THE INVENTION

1. Field of the Invention

The present invention relates to an operating device and, more specifically, to an operating device with improved operability and an image forming apparatus including the operating device.

2. Description of the Background Art

Recently, image forming apparatuses such as a printer, a complex machine or an MFP (Multifunction Peripheral) having an operating device such as a display-integrated type touch panel have come to be widely used. It is possible for a user to have the image forming apparatus execute processes of printing an image of a document on a sheet of paper or changing setting of the image forming apparatus, by operating the operating device.

Japanese Patent Laying-Open No. 8-293224 discloses an operating device for a complex copy machine having functions of copying, facsimile and the like combined.

Referring to FIG. 1, an operating device 30 described in Japanese Patent Laying-Open No. 8-293224 includes: a case 108 of flat, rectangular parallelepiped shape; a display portion 32 arranged at an upper central side on an upper surface of case 108; keys 34 to 56 operated when various functions of the complex copying machine are to be executed, arranged on the lower and right sides of display portion 32; a longitudinal shaft 58 arranged on a left side of the upper surface of case 108; a key unit 60 provided on case 108 to be rotatable about shaft 58; and a second key unit (not shown) arranged below key unit 60 and operable when key unit 60 is opened by turning it upward about shaft 58. In the present specification, a member operated for opening/closing weak current, such as a key on a keyboard, will be referred to as a key.

Referring to FIGS. 1, 2A and 2B, key unit 60 includes a plurality (in the figure, twenty) of keys 68 to 106 arranged on an upper surface of key unit 60, and a switching lid 62 provided on key unit 60 rotatable about a rotation shaft 64 provided on the upper surface of key unit 60. When switching lid 62 is turned about shaft 64, the state of upper surface of key unit 60 is switched between the state shown in FIG. 2A and the state shown in FIG. 2B.

Referring to FIG. 2A, switching lid 62 has such openings that expose keys 88 to 96 and hide portions therearound when switching lid 62 is arranged lower than shaft 64. Of the two surfaces of switching lid 62, that surface which faces upward in the state shown in FIG. 2A will be referred to as a front surface of switching lid 62, and the opposite surface will be referred to as a rear surface. When switching lid 62 is turned upward about shaft 64, the state of FIG. 2B is attained. In this state, keys 68 to 76 are exposed through the openings, and portions therearound are hidden by switching lid 62.

On the upper surface of key unit 60, character sequences "F1", "F2" to "F10", "F31" and "F32" to "F40" are printed on an upper side of keys 86 to 106. On the front surface of switching lid 62, character sequences "F11" to "F20" are printed at positions that come above keys 88 to 106 in the state shown in FIG. 2A. On the rear surface, character sequences "F21" to "F30" are printed at positions that come above keys 68 to 86 in the state shown in FIG. 2B. In the state shown in FIG. 2A, character sequences "F31" to "F40" on the surface of key unit 60 are hidden by switching lid 62, and on the upper side of keys 88 to 106, character sequences "F11" to "F20" printed on the front surface of switching lid 62 appear. In the state shown in FIG. 2B, character sequences "F1" to "F10" on the surface of key unit 60 are hidden by switching lid 62, and on the upper side of keys 68 to 86, character sequences "F21" to "F30" printed on the rear surface of switching lid 62 appear.

"F1" to "F40" represent names of functions executed by complex copy machine when keys 68 to 106 are operated. Since the complex copy machine has a number of functions, various functions are allocated to keys 68 to 106.

The complex copy machine has a function of detecting whether the switching lid 62 is at the state of FIG. 2A or FIG. 2B, and depending on the state, switches the functions to be allocated to respective keys 68 to 106. Therefore, it is possible to designate 40 different functions by 20 keys.

By such a structure, the technique of Japanese Patent Laying-Open No. 8-293224 provides an operating device 30 for a complex copy machine that has the compact and simple structure and allows easy operation by the user.

It is noted that function names are not limited to "F1" to "F40". For instance, when operating device 30 is manufactured, images assisting the user to understand the contents of functions may be printed. Key functions or names may be printed in different languages for different countries in which operating device 30 is to be sold.

Different from the example described in Japanese Patent Laying-Open No. 8-293224 in which one key is used in different ways, if a single function is allocated to one key, an image representing the contents of function is often printed on a key-top of each key.

As described above, Japanese Patent Laying-Open No. 8-293224 discloses a method of allocating a plurality of functions to one key. Once a function is allocated to a key, however, not only the character sequence or image printed on the upper surface of key unit 60 but also the character sequences or images printed on the front and rear surfaces of switching lid 62 must be changed, if the function of the key is to be changed. When these are printed at the time of manufacturing the device, it is necessary to print the description of functions around the key or on key tops in a language corresponding to the country where the device is to be installed. In Canada, two languages, that is, English and French, are used as official languages and, therefore, a user must select a language for display when he/she buys a device. Therefore, it is necessary to prepare operating devices on which functions are printed in English and devices on which descriptions are printed in French.

After purchasing a device, if the description of functions printed on the operating device is unfit for the user, the user must return the device he/she purchased and again purchase a device that is fit for the user. This is very troublesome.

SUMMARY OF THE INVENTION

Therefore, an object of the present invention is to provide an operating device that allows easy operation by the user in accordance with custom, environment and preference of each user, and an image forming apparatus including the operating device.

Inventors of the present invention came to an idea of using a non-volatile display device represented by electronic paper, as a possible solution to the technical problem disclosed in Japanese Patent Laying-Open No. 8-293224, and have reached the concept of the present invention.

Electronic paper is a thin display technology similar to a liquid crystal display and the like, and it has similar appearance as ordinary paper. The electronic paper is characterized in that displayed contents are electrically rewritable, and that power consumption thereof is very low as electric power is unnecessary to retain the displayed contents. In addition, electronic paper is non-volatile, that is, once the displayed contents are rewritten, the displayed contents are maintained even when power is turned off.

By way of example, Japanese Patent Laying-Open No. 2003-209718 proposes a technique of utilizing electronic paper in a digital camera. According to the technique disclosed in Japanese Patent Laying-Open No. 2003-209718, when a power button is pressed by a user while the power is on, remaining battery level is calculated, and the maximum number of pictures that can be taken is calculated from available memory space. These pieces of calculated information are output to electronic paper, and on the electronic paper, information related to the remaining battery level and the maximum number of pictures that can be taken at present is displayed. Even when the power of digital camera is turned off thereafter, the displayed contents of information related to the remaining battery level and the maximum number of pictures that can be taken before power-off are maintained.

According to Japanese Patent Laying-Open No1. 2003-209718, while the power is off, it is possible to let the user confirm the state of electronic device such as remaining battery level, the number of pictures that can be taken and the like, without turning on the power. Therefore, it is possible for the user to use the electronic device while effectively utilizing electric power. By utilizing such a characteristic of non-volatile display device, the problem of prior art disclosed in Japanese Patent Laying-Open No. 8-293224 can be solved in the following manner.

According to a first aspect, the present invention provides an operating device for controlling an apparatus as an object of control, in accordance with an instruction by a user. The operating device includes a panel having a main surface; a hardware component provided on the main surface; and a display device provided on the main surface or on the hardware component, in relation to the hardware component, allowing rewriting of displayed contents.

As the contents displayed on the display device are rewritable, when a function of a hardware component is changed or a language to be used is changed, it is possible to rewrite the contents displayed on the display device accordingly. Therefore, when a function allocated to a hardware product is changed while arrangement of the hardware product is not changed, confusion of the user caused by the change can be prevented. As a result, an operating device that allows easy operation by the user in accordance with custom, environment and preference of each user can be provided.

Preferably, the hardware product includes a hardware key.

More preferably, the display device includes a display unit provided close to the hardware key on the main surface and allowing rewriting of displayed contents.

It is possible to change the function allocated to the hardware key while not changing the arrangement of hardware key itself. Therefore, an operating device that allows easy operation by the user in accordance with custom, environment and preference of each user, without imposing excessive burden on the user, can be provided.

More preferably, the display device includes a display unit provided on a key top of the hardware key and allowing rewriting of displayed contents.

As the display device is provided on the key top, the relation between each key and its function or name can more easily be understood, and hence, an operating device that allows easier operation by each user can be provided.

More preferably, the hardware component includes a state displaying component provided on the main surface, and having its state of display changed between a first display state and a second display state in response to a display signal.

It is often difficult to recognize what is represented by the state of state displaying component as such. Further, the meaning of the states may change depending on operational mode. In such a case, the contents displayed on the display device can be switched and, therefore, the meanings of the states can easily be understood. This makes it easier to understand and operate the operating device.

More preferably, the display device includes a display unit provided closer to the state displaying component on the main surface and allowing rewriting of displayed contents.

As the display unit is provided close to the state displaying component, correspondence between the state of state displaying component and the meaning of the state can more easily be understood by the user.

More preferably, the display device includes a non-volatile display device, provided in relation to the hardware component, on the main surface or on the hardware component.

When the non-volatile display device is used, the displayed contents can be maintained even when power supply to the operating device is shut off. Therefore, the operation of the device can easily be understood even in the power-off state.

More preferably, the display device includes a character sequence display device provided in relation to the hardware component, on the main surface or on the hardware component, for displaying a character sequence.

More preferably, the display device includes an image display device provided in relation to the hardware component, on the main surface or on the hardware component, for displaying an image.

As the character sequence or image can be switched for display, appropriate display can be used in accordance with the user. For instance, use of an icon allows easier understanding of key operation, regardless of any difference in language used by the users.

More preferably, the operating device further includes a language switching device allowing a user to switch languages, and a character sequence changing device coupled to the display device and the language switching device, for changing, in response to switching of language by the language switching device, a character sequence displayed on the display device to a character sequence of the switched language.

When the language is switched, the character sequence displayed on the display device is automatically switched to the character sequence of the switched language. This allows use of the device in various countries, or use of one operating device while switching among a number of languages in accordance with languages used by persons working in the room where the device is installed.

More preferably, the operating device further includes: a display switching device for switching an image displayed on the switching device, in accordance with a user operation; and a function switching device coupled to the hardware component and the display switching device, for switching, in response to switching of an image displayed on the display device by the display switching device, a function allocated to the hardware provided in relation to the display device of which image has been switched, to a function corresponding to the image.

More preferably, the operating device includes a plurality of hardware components. The display device is formed of a plurality of display devices provided in relation to the plurality of hardware components respectively. The operating device further includes a display switching device coupled to the plurality of display devices, for switching displayed contents of the plurality of display devices in accordance with a user operation; and a function switching device coupled to the plurality of hardware components and the display switching device, for switching a function of that hardware component among the plurality of hardware components which is provided in relation to the display device of which displayed contents have been switched by the display switching device, among the plurality of display devices.

More preferably, the function switching device includes a device coupled to the plurality of hardware components and the display switching device for allocating a function to a hardware component which is provided in relation to the display device of which displayed contents have been switched by the display switching device, among the plurality of display devices, such that the function of the hardware component provided in relation to the said display device does not overlap with a function of a hardware component provided in relation to a display device different from the said display device.

If there are a plurality of hardware components, functions are allocated such that allocated functions do not overlap. By such an arrangement, a large number of different functions can be realized, fully making use of the number of hardware components.

More preferably, the operating device further includes a plurality of display devices. The operating device further includes a display control device coupled to the display devices for controlling displayed contents of the display devices such that character sequences are displayed in one same language on the display devices.

Since uniform language is displayed on respective display devices, user understanding becomes easier.

More preferably, the operating device further has a display unit, and uniform language is used for the display on the display device and the display unit.

When display mean is provided separate from the hardware components, its display language is the same as the language used in the operating device. This is effective because the operating method can easily be understood by the user.

More preferably, the operating device further includes a switching device coupled to the display device, for switching, user by user, character sequence or image to be displayed on the display device.

The displayed character sequence or image can be switched user by user of the display device and, therefore, hardware component arrangement optimal for each user can be attained. This effectively improves operation efficiency for the user.

More preferably, the operating device includes a plurality of display devices. The plurality of display devices are divided into a plurality of groups. The operating device further includes a display switching device coupled to the plurality of display devices for switching, group by group, images displayed on the plurality of display devices, in accordance with a user operation.

The user can change the function allocated to hardware components group by group, so that operation efficiency for the user can be improved. Specifically, assume that there are a relatively large number of hardware components provided on the operating device. It would be a waste of time if functions must be allocated to all hardware components one at a time. By dividing hardware components into groups and allocating functions group by group, the process of allocating functions by the user can be made easier.

According to a second aspect, the present invention provides an image forming apparatus, including the operating device described above and a control device executing a prescribed process in response to an operation by a user of the operating device.

Preferably, the image forming apparatus further includes an image switching device coupled to the display device, for switching an image displayed on any of the display devices based on a mode in which the image forming apparatus can operate.

In the display device, the character sequence or image displayed on the display device can be switched based on the operable mode in the image forming apparatus and, therefore, if there is any mode that is unavailable at that time, the character sequence or image corresponding to the mode may be erased, so as to prevent erroneous operation by the user to designate the mode.

According to the present invention, the contents displayed on the display device are rewritable and, therefore, when a function of hardware component is changed or the used language is changed, the contents displayed on the display device can be changed in accordance with the change. Therefore, when a function allocated to a hardware component is changed while arrangement of the hardware component is not changed, confusion of the user operation caused by the change can be prevented. Further, in accordance with switching of language, it is possible to change the language of character sequence to be displayed, or the display can be switched to an image such as an icon, in place of the character sequence. Further, if functions are to be allocated to hardware components, by simply allocating a character sequence indicating the function to be allocated to each hardware component, the function corresponding to the character sequence can automatically be allocated to each hardware component. As a result, an operating device that allows easy operation by the user in accordance with a custom, an environment and a preference of each user can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 shows correspondence between key numbers and function numbers.

FIG. 19 shows correspondence between group numbers and key numbers.

DESCRIPTION OF THE PREFERRED EMBODIMENTS

Figure 1:
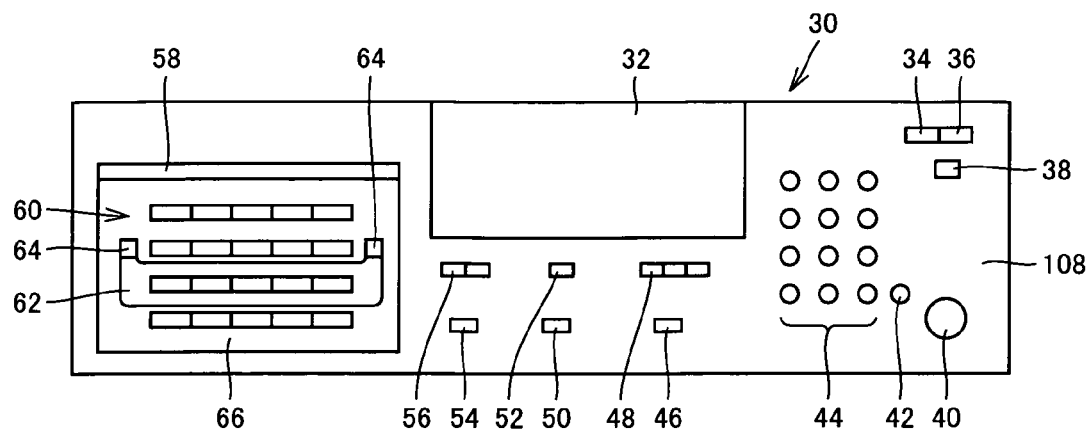
FIG. 1 shows an appearance of the operating device described in Japanese Patent Laying-Open No. 2008-217576.
Figure 2A:
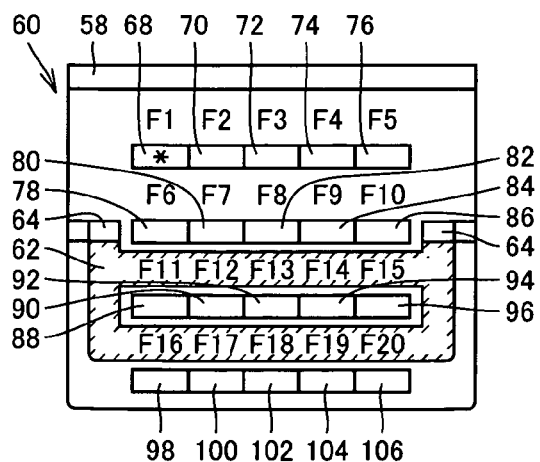
FIGS. 2A and 2B show arrangements of a key unit 60 shown in FIG. 1.
Figure 2B:
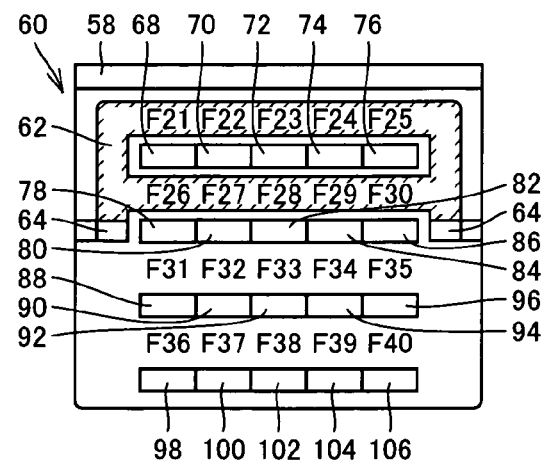

In the following, embodiments of the present invention will be described in detail with reference to the figures. In the description of embodiments, the same components are denoted by the same reference characters. Their functions and names are also the same. Therefore, detailed description thereof will not be repeated.

First Embodiment

<Overall Configuration>

Figure 3:
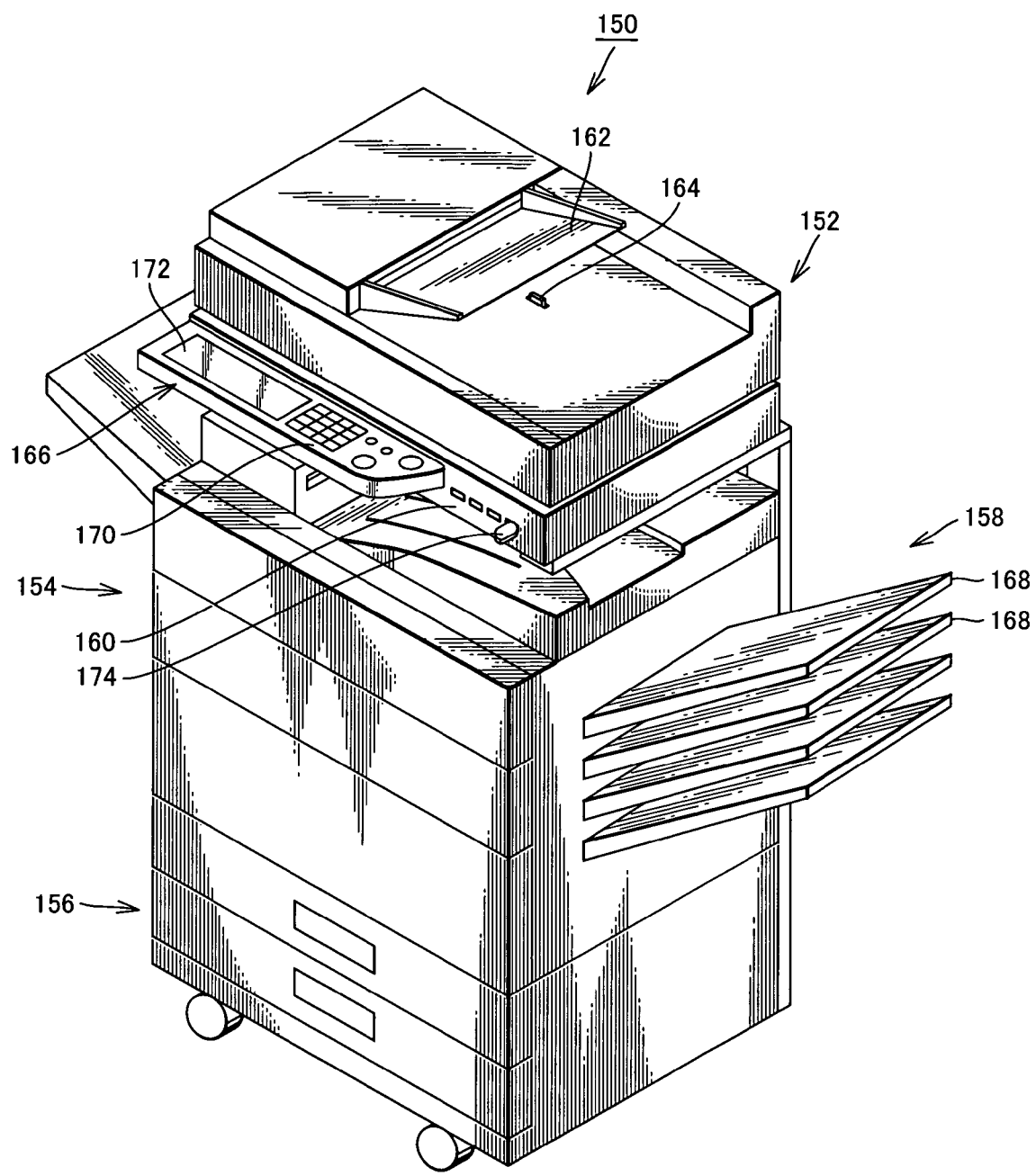
FIG. 3 is a perspective view showing an appearance of an image forming apparatus 150 in accordance with a first embodiment of the present invention.
Figure 4:
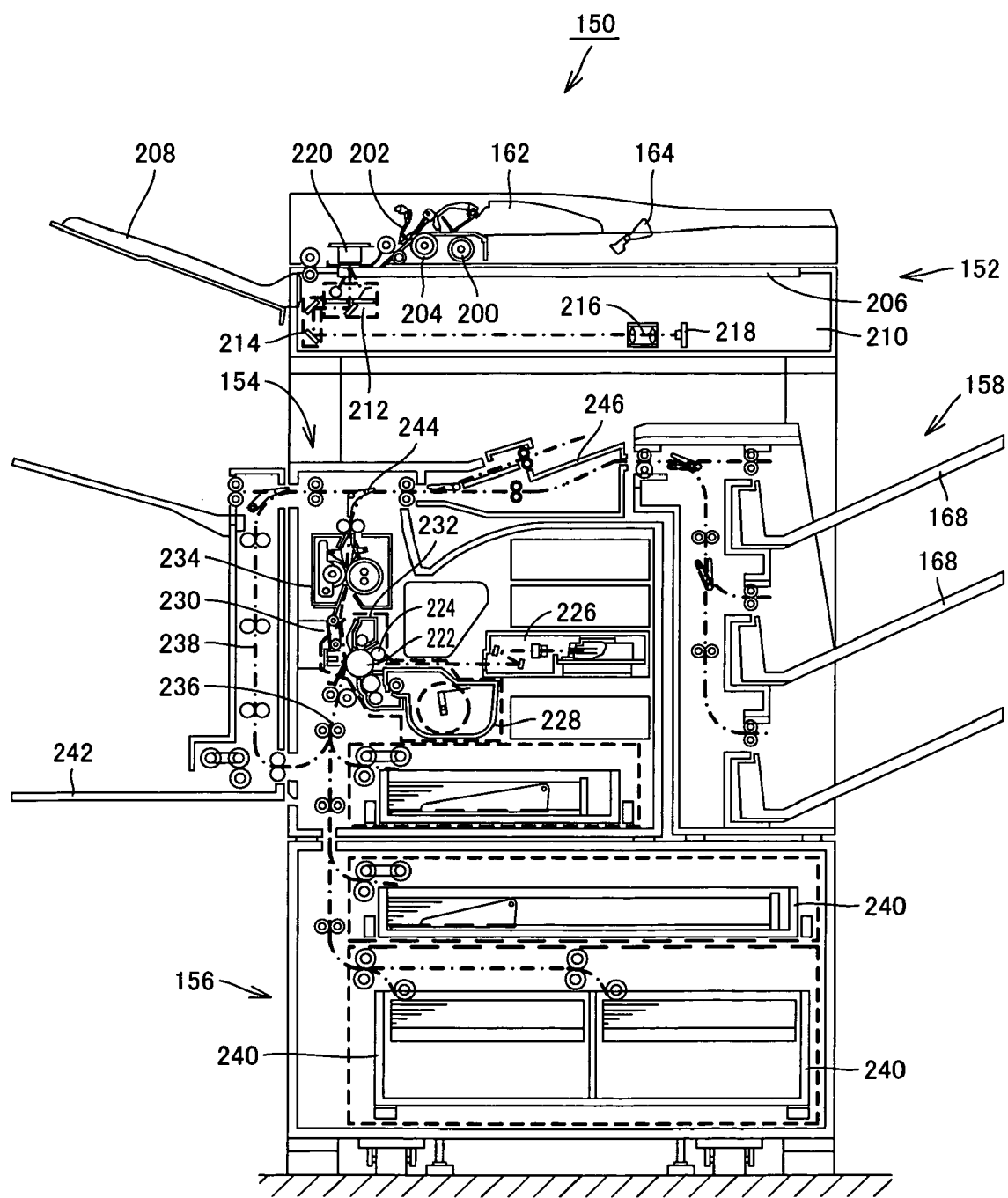
FIG. 4 schematically shows an internal configuration of image forming apparatus 150 shown in FIG. 3.

Referring to FIGS. 3 and 4, an image forming apparatus 150 in accordance with the first embodiment of the present invention is a digital multifunctional printer. The image forming apparatus 150 is capable of operating selectively in, for example, a copy mode in which an image of a document is read and printed on a sheet of printing paper, a facsimile mode in which an image of a document is read and transmitted and an image of a document is received and printed on a sheet of printing paper, and a printer mode in which an image received through a network from an information terminal, not shown, is printed on a sheet of printing paper.

Image forming apparatus 150 includes a document feeding and reading unit 152, an image forming unit 154, a paper feeding unit 156, a post processing device 158, an operating device 166, a USB (Universal Serial Bus) memory 174, and a USB interface 160 for connecting USB memory 174 to document feeding and reading unit 152.

Internal configuration of image forming apparatus 150 will be described taking an operation in the copy mode as an example.

When a document is set on a document set tray 162 of document feeding and reading unit 152, first, a document detection sensor 164 detects that the document has been set. A user operates operating device 166 of document feeding and reading unit 152 to input and set the size of printing paper, magnification and the like. Thereafter, an instruction to start copying is given in accordance with the contents of operation on operating device 166.

In response to an operation of operating device 166, document feeding and reading unit 152 draws the document on document set tray 162 one by one, by pick-up roller 200, and feeds the drawn document to a platen glass 206 through a separation plate 202 and a feed roller 204, feeds the document in a sub-scanning direction on platen glass 206, and discharges the document to a document discharge tray 208.

At this time, a surface (lower surface) of the document is read by a first reading unit 210. Specifically, the first reading unit 210 first moves and positions a first scanning unit 212 to a prescribed position, and positions a second scanning unit 214 at a prescribed position. The document surface is irradiated through platen glass 206 with an exposure lamp of first scanning unit 212, and light reflected from the document is directed to an imaging lens 216 through reflection mirrors of first and second scanning units 212 and 214. The light reflected from the document is collected by imaging lens 216 to a CCD (Charge Coupled Device) 218, and the image on the document surface is formed on CCD 218, whereby the image on the document surface is read.

Further, a rear surface (upper surface) of the document is read by the second reading unit 220. The second reading unit 220 is arranged above platen glass 206. The second reading unit 220 is formed of an LED (Light Emitting Diode) array, a fluorescent lamp and the like. The second reading unit 220 includes an exposure lamp, irradiating the rear surface of document, a SELFOC (registered trademark) lens array collecting light reflected from the document pixel by pixel, and a contact image sensor (CIS) performing photo-electric conversion of the light reflected from the document received through SELFOC lens array and outputting an analog image signal.

Further, it is possible to open an upper part of document feeding and reading unit 152 and to place a document on platen glass 206, and to read the document surface in this state by the first reading unit 210. In this case, the first and second scanning units 212 and 214 are moved in the sub-scanning direction while maintaining a prescribed speed relation to each other, whereby the document on platen glass 206 is exposed by the first scanning unit 212 and the light reflected from the document is guided by the first and second scanning units 212 and 214 to imaging lens 216. The document image is formed on CCD 218 by the imaging lens 216.

Figure 5:
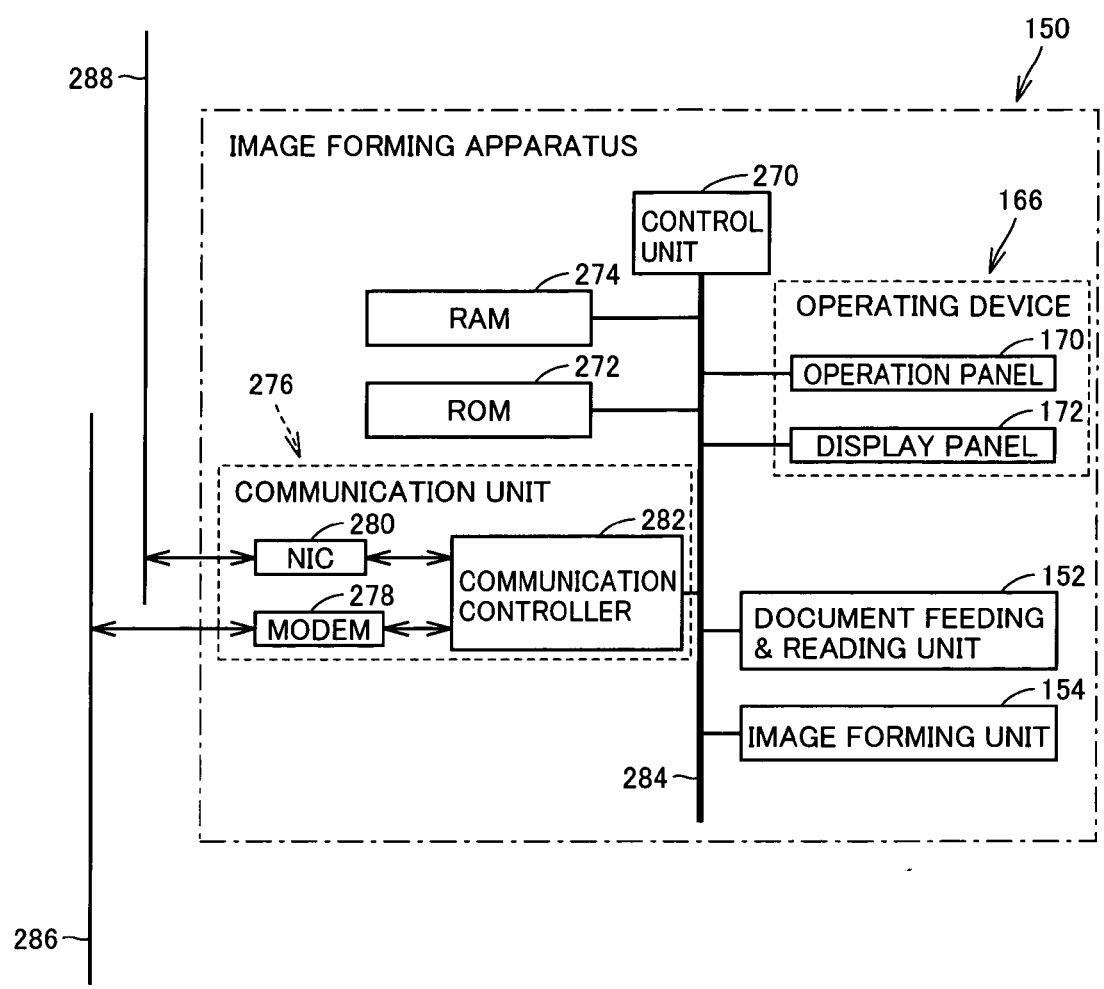
FIG. 5 is a block diagram showing hardware configuration divided function by function of the image forming apparatus shown in FIG. 3.

When one or both surfaces of the document are read in the above-described manner, image data representing the image or images on one or both surfaces of the document is input to a control unit 270 implemented, for example, by a microcomputer shown in FIG. 5, in which the input image data is subjected to various types of image processing and output to image forming unit 154.

Image forming unit 154 prints the document image on a sheet of recording paper based on the image data, and it includes a photoreceptor drum 222, a charger 224, a laser scanning unit (hereinafter denoted as "LSU") 226, a developer 228, a transfer device 230, a cleaning device 232, a fixing device 234, a neutralizer, not shown, and the like.

Further, image forming unit 154 is provided with a main feeding path 236 and a reverse feeding path 238. A sheet of recording paper fed from paper feeding unit 156 is fed along main feeding path 236. Paper feeding unit 156 draws sheets of recording paper contained in paper cassette 240 or placed on a manual feed tray 242 one by one, and feeds the drawn sheet of recording paper to main feeding path 236 of image forming unit 154.

While the sheet of paper is fed along main feeding path 236 of image forming unit 154, that is, while the sheet of paper passes between photoreceptor drum 222 and transfer device 230 and further through fixing device 234, printing of image data is done on the sheet of recording paper.

Photoreceptor drum 222 rotates in one direction, and its surface is cleaned by cleaning device 232 and the neutralizer, and then uniformly charged by charger 224.

LSU 226 modulates laser beam based on the image data output from document feeding and reading unit 152, and repeatedly scans the surface of photoreceptor drum 222 with the laser beam in the main scanning direction, whereby an electrostatic latent image is formed on the surface of photoreceptor drum 222.

Developer 228 develops the electrostatic latent image by supplying toner to the surface of photoreceptor drum 222, and forms a toner image on the surface of photoreceptor drum 222.

Transfer device 230 transfers the toner image on the surface of photoreceptor drum 222, to the sheet of recording paper passing through transfer device 230 and photoreceptor drum 222.

Fixing device 234 fixes the toner image on the sheet of recording paper, by applying heat and pressure to the sheet of recording paper.

At a connecting position between main feeding path 236 and reverse feeding path 238, a branching pawl 244 is provided. When printing is to be done only on one side of the sheet of recording paper, branching pawl 244 is positioned such that the sheet of recording paper fed from fixing device 234 is guided by branching pawl 244 to discharge tray 246 or to a post processing device 158.

When printing is to be done on both surfaces of the sheet of recording paper, branching pawl 244 is turned in a prescribed direction so that the sheet of recording paper is guided to reverse feeding path 238. The sheet of recording paper is turned over as it passes through reverse feeding path 238, and then it is again fed to the main feeding path 236 and, as the sheet of recording paper is again fed along the main feeding path 236, printing is done on the rear surface, and the sheet is guided to discharge tray 246 or post processing device 158.

The sheet of recording paper on which printing has been done as described above is guided to discharge tray 246 or post processing device 158, and discharged to discharge tray 246 or to any of discharge trays 168 of post processing device 158.

Post processing device 158 is for performing processes of sorting and discharging a plurality of sheets of recording paper to discharge trays 168, punching each sheet of recording paper, and stapling the sheets of paper. By way of example, when a number of printed copies are to be prepared, post processing device 158 sorts and discharges sheets of recording paper to discharge trays 168 such that sorted sets of copies are allotted one by one, and each set of sheets on each discharge tray 168 is punched or stapled, whereby printed copies are provided.

<Hardware Configuration>

Referring to FIG. 5, image forming apparatus 150 includes document feeding and reading unit 152 capable of reading document image, image forming unit 154 providing printed output by forming an image read by document feeding and reading unit 152 on a sheet of paper with the image color reproduced by electro-photographic process, a communication unit 276 performing communication with other device or devices through a telephone line 286 and LAN (Local Area Network) 288, and operating device 166 allowing settings of various functions related to the image forming process. Image forming apparatus 150 further includes a bus 284 to which document feeding and reading unit 152, image forming unit 154, communication unit 276 and operating device 166 are connected, and a control unit 270 realizing general functions of the image forming apparatus, an ROM (Read Only Memory) 272 storing a program and the like for realizing the function of control unit 270, and an RAM (Random Access Memory) 274 for providing a storage area for various programs, all connected to bus 284.

Control unit 270 is in charge of overall control of image forming apparatus 150, and it is implemented by a CPU (Central Processing Unit) or the like.

ROM 272 stores a program, data and the like necessary for controlling an operation of image forming apparatus 150. Control unit 270 controls image forming apparatus 150 in accordance with the program and data stored in the ROM 272, and executes control related to various functions of image forming apparatus 150.

RAM 274 has a function of a working memory temporarily storing results of operations and processes performed by control unit 270, a function of a back-up memory storing count value, jam and service error history information, information of supplies and the like and a function of a frame memory storing image data.

Communication unit 276 includes a modem 278 providing an interface with telephone line 286 connected to a facsimile machine, not shown, an NIC (Network Interface Card) 280 providing an interface with a LAN (Local Area Network) line 288 connected to an information terminal such as a computer, not shown, and a communication controller 282 controlling operations of modem 278 and NIC 280.

It is noted that document feeding and reading unit 152, image forming unit 154, ROM 272, RAM 274, plate-shaped operation panel 170 and display panel 172 of operating device 166, and communication controller 282 of communication unit 276 are controlled by control unit 270. Arrangements of operation panel 170 and display panel 172 will be described later.

<Appearance of Operating Device 166>

Figure 6:
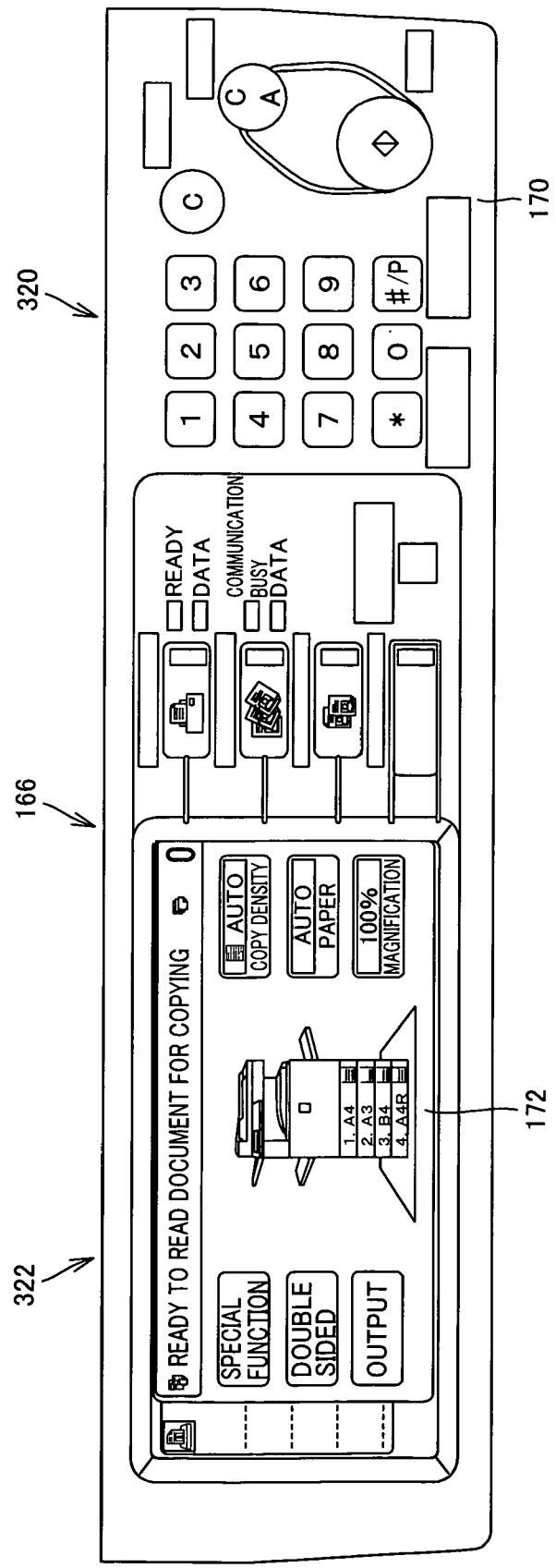
FIG. 6 is a plan view of the operating device 166 shown in FIG. 3.

Referring to FIG. 6, operation panel 170 is arranged on a right area 320 on the surface of operating device 166, and it includes ten keys, hard keys as various other operation buttons, a plate-shaped operation panel 170 having a plurality of sheets of electronic paper formed close to each of the hard keys, and a display panel 172 arranged from the central portion to the left area 322 of operating device 166 and formed of a small, touch-panel integrated type liquid crystal display.

Operation panel 170 and display panel 172 are held on one housing, and operating device 166 is formed as a single body as a whole.

In operating device 166, it is possible for the user to confirm the state of image forming apparatus 150, job processing status or the like, by the display on display panel 172. On a display area of the liquid crystal display on display panel 172, a selection button is displayed. When the user presses with his/her finger the area where the selection button is displayed, touch panel detects the pressed position. By comparing the displayed position of selection button and the pressed position of touch panel on a program, image forming apparatus 150 sets functions and instructs operations.

<Appearance of Operation Panel 170>

Figure 7:
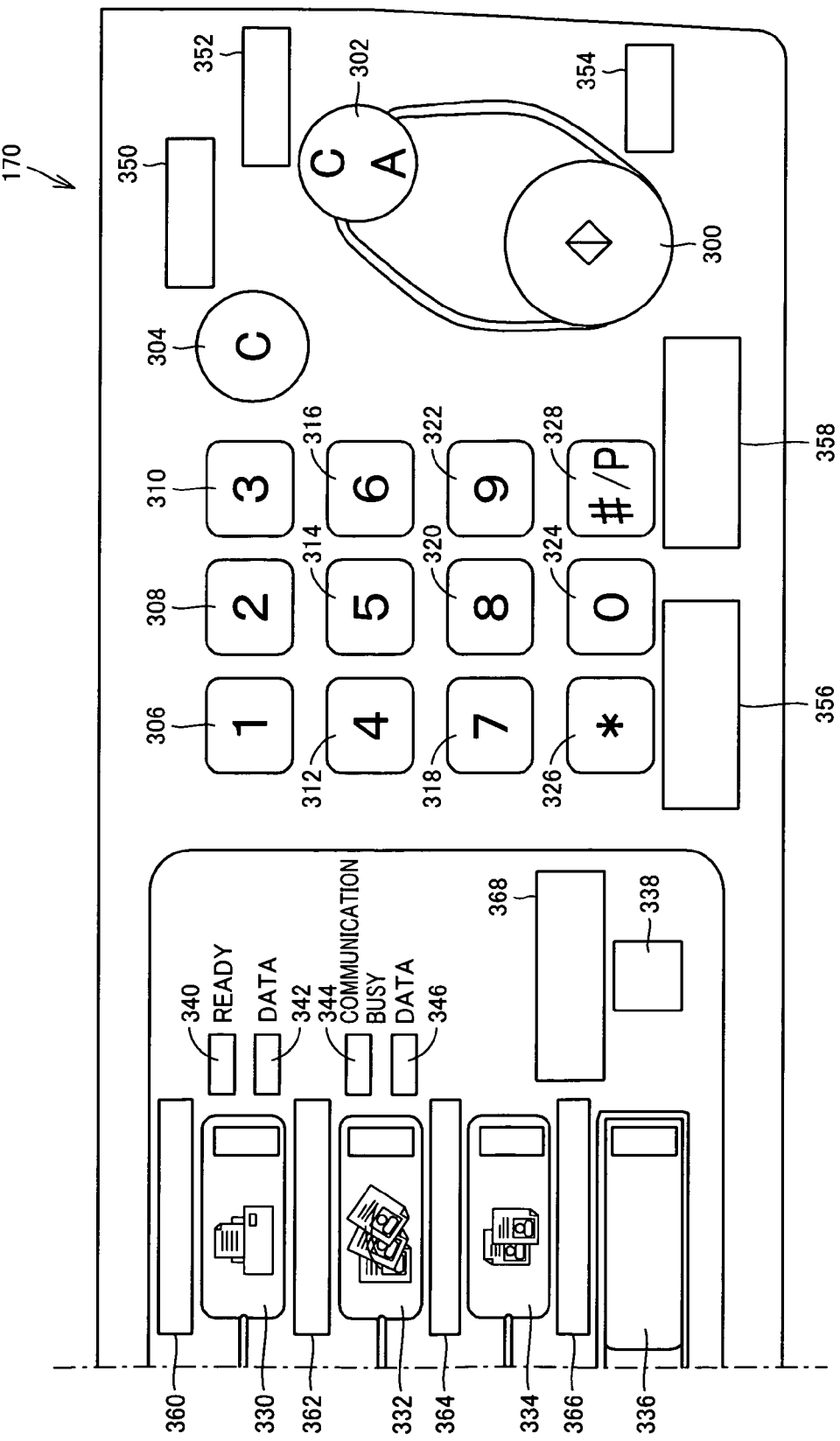
FIGS. 7 and 8 are plan views of a right half of an operation panel 170 shown in FIG. 3.

Referring to FIG. 7, operation panel 170 includes: a start key 300 operated by the user for starting execution of a function of image forming apparatus; ten keys 306 to 328; an all clear key 302 operated when all of the set operation conditions are to be cleared; a clear key 304 operated by the user when an immediately preceding input value or the like is to be cancelled; a printer mode key 330, a facsimile mode key 332 and a copy mode key 334 for switching the operational mode of image forming apparatus 150 to the printer mode, facsimile mode and copy mode, respectively; a job status key 336 operated by the user when a job list indicating status of various jobs executed by image forming apparatus 150 is to be displayed on display panel 172; and a custom setting key 338 operated by the user for setting various operation conditions.

Operation panel 170 further includes two LEDs 340 and 342 provided on the right side and close to key 330, and two LEDs 344 and 346 provided on the right side of facsimile mode key 332. These LEDs indicate states of operation of image forming apparatus, and on the right side of respective LEDs, character sequences "READY", "DATA", "COMMUNICATION BUSY" and "DATA" are printed, giving the user hints of corresponding functions.

In the present embodiment, on key tops of keys 304, 302, 300 and 306 to 338, character sequences or images such as icons are printed, giving the user hints of functions of respective keys.

Operation panel 170 further includes rectangular sheets of electronic paper 350 to 368, positioned close to keys 304, 302, 300 and 326 to 338, respectively.

Displaying operation of electronic paper 350 to 368 is realized by physically moving media particles by applying bias (electrophoresis). Electronic paper 350 to 368 is a non-volatile display member of which displayed contents can be kept continuously even after power conduction is shut off, as the moved particles (that went under electrophoresis) can retain their state and, as a result, the displayed contents are maintained, even when there is a transition from normal operation mode to sleep mode for saving power consumption and power conduction is stopped.

Particularly, in the present embodiment, control unit 270 executes a function of forming display data corresponding to a language designated by the user based on data in RAM 274 or the like, and displaying the formed data on electronic paper 350 to 368. By way of example, when the user presses custom setting key 338, an image showing a list of languages allowing selection of a language appears on display panel 172. If the user selects Japanese, control unit 270 forms display data corresponding to Japanese, and displays the formed data on electronic paper 350 to 368. If the user selects English, control unit 270 forms display data corresponding to English, and displays the formed data on electronic paper 350 to 368.

In the following, details of the arrangement on the right half of operation panel 170, when default display data corresponding to Japanese are displayed on electronic paper 350 to 368, will be described.

Figure 8:
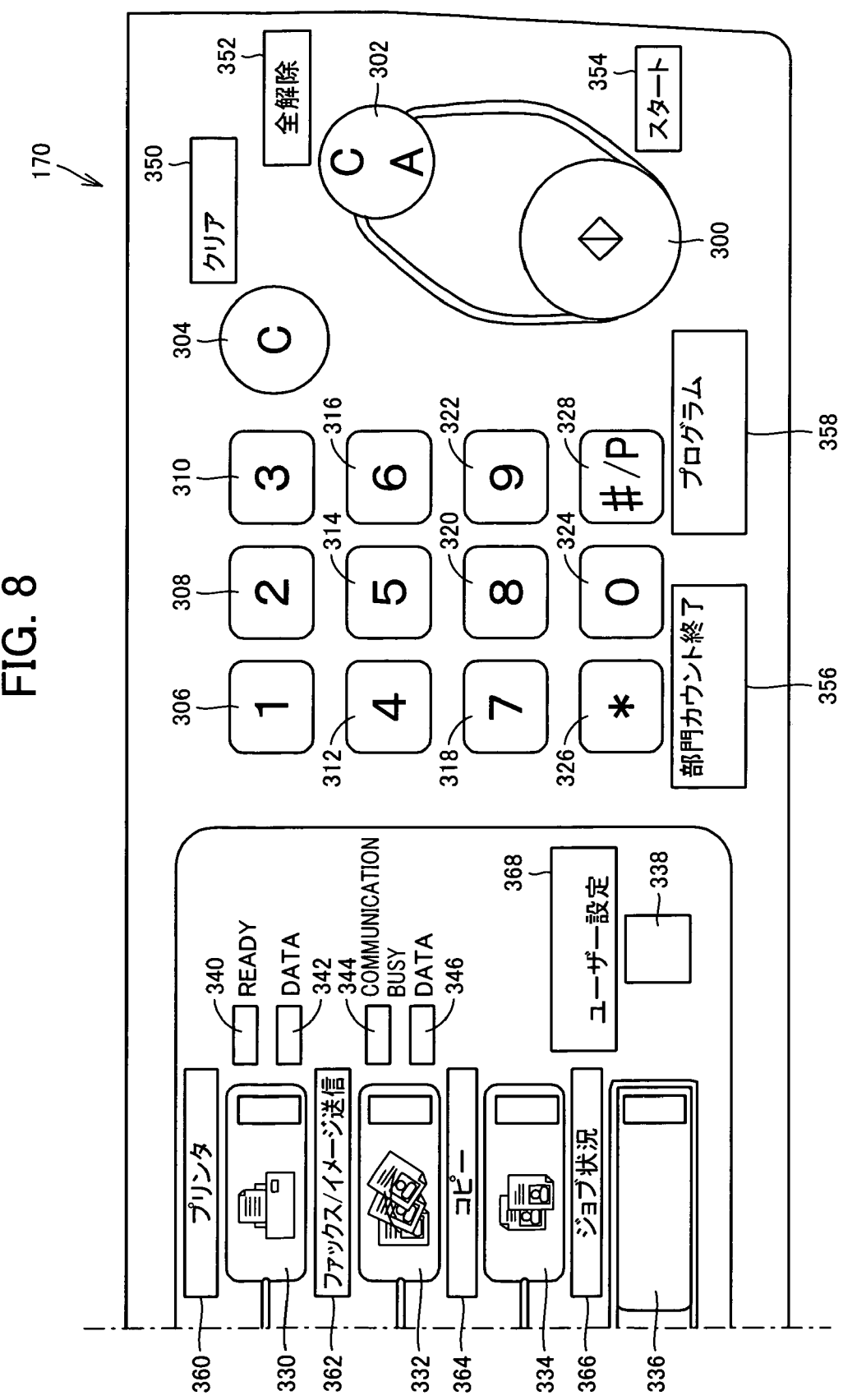
Figure 9:
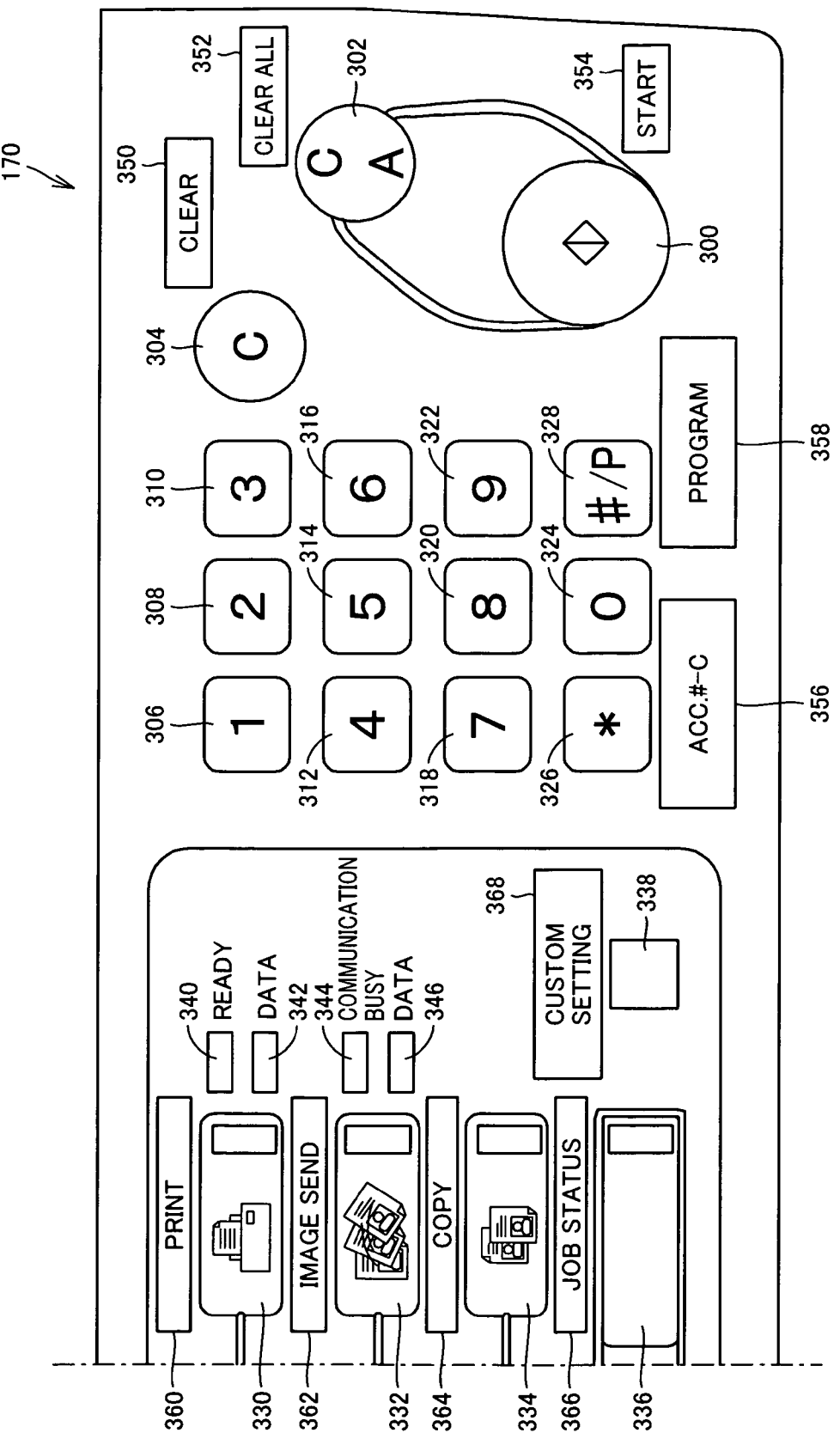
FIG. 9 shows operation panel 170 of FIG. 8, with the language switched.

Referring to FIG. 8, when the user designates Japanese, words describing functions of keys arranged close to respective sheets of electronic paper to the user are displayed in Japanese, on respective sheets of electronic paper 350 to 368. If the user selects English, all displays are given in English. Because the electronic paper is used for the display, these displays remain even after the power is turned off, and therefore, they are substantially the same as descriptions printed on the operation panel.

Figure 14:
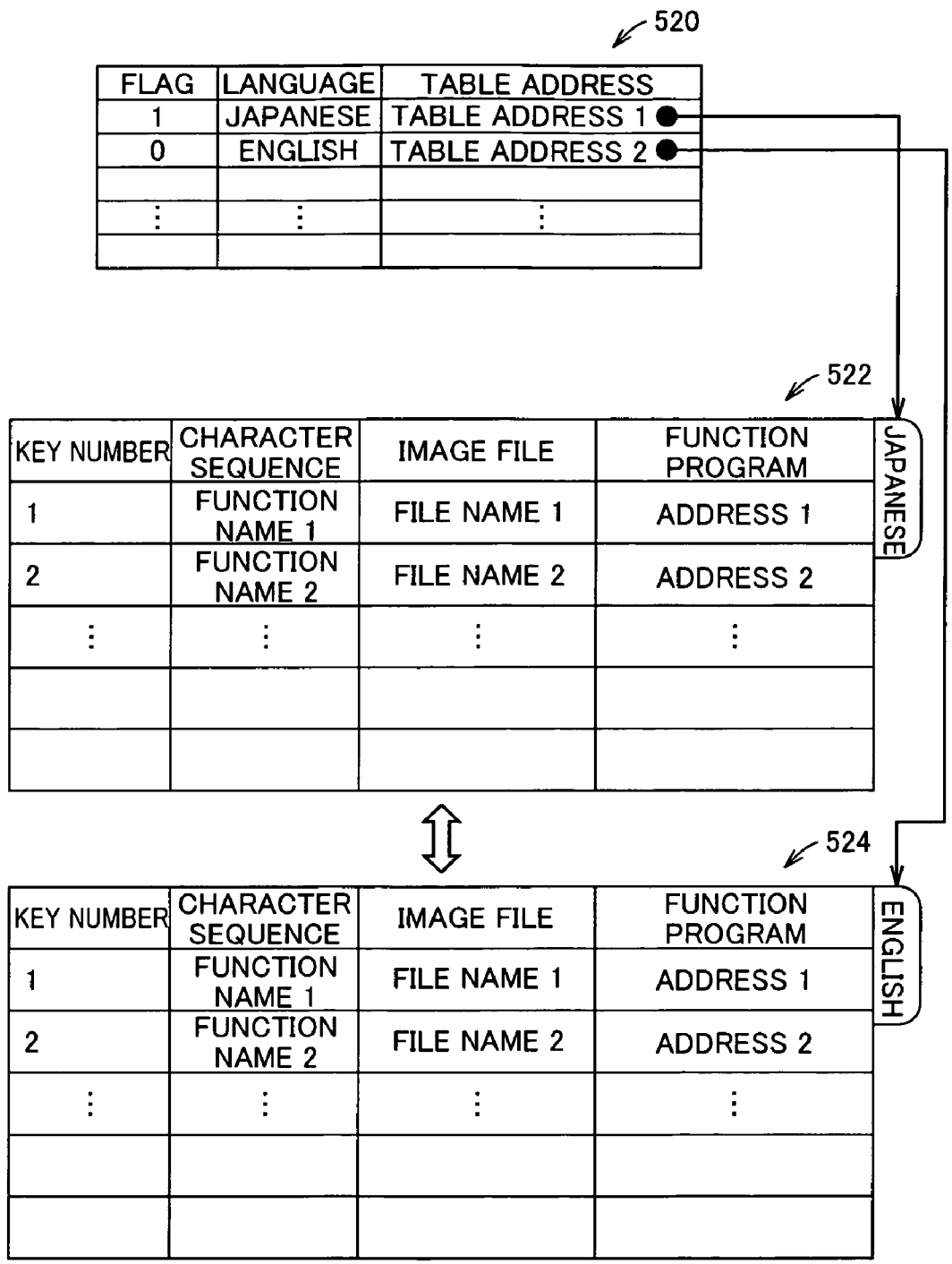
FIG. 14 illustrates data structure necessary for switching language of character sequences to be displayed on an electronic paper and on the display panel.

In image forming apparatus 150 in accordance with the present embodiment, data necessary for switching the language of character sequence displayed on electronic paper and display panel are stored as a table shown in FIG. 14 in ROM 272.

Referring to FIG. 14, the data includes a language table 520 storing names of usable languages and character sequence tables prepared and stored in advance for each language, and a plurality of character sequence tables 522, 524 and the like corresponding to the languages stored in language table 520. In the example shown in FIG. 14, character sequence table 522 is for Japanese, and character sequence table 524 is for English.

Each record of language table 520 includes a flag indicating whether or not the language of the corresponding row is used, the language name, and an address of the corresponding character sequence table. The flag "0" indicates that the language is not used, and "1" indicates that the language is used.

By way of example, character sequence table 522 includes: key number allotted to each key; character sequence of the corresponding language (for example, Japanese) corresponding to the function allocated to the key; an image file name storing an image file of an icon, if an image such as the icon is to be displayed in place of a character sequence; and an address at which a function program for realizing the function is stored. In the present embodiment, it is assumed that among the character sequence tables, functions allocated to the same key numbers are always the same. In other words, it is impossible for the user to change the contents of character sequence tables 522, 524 and the like.

Figure 15:
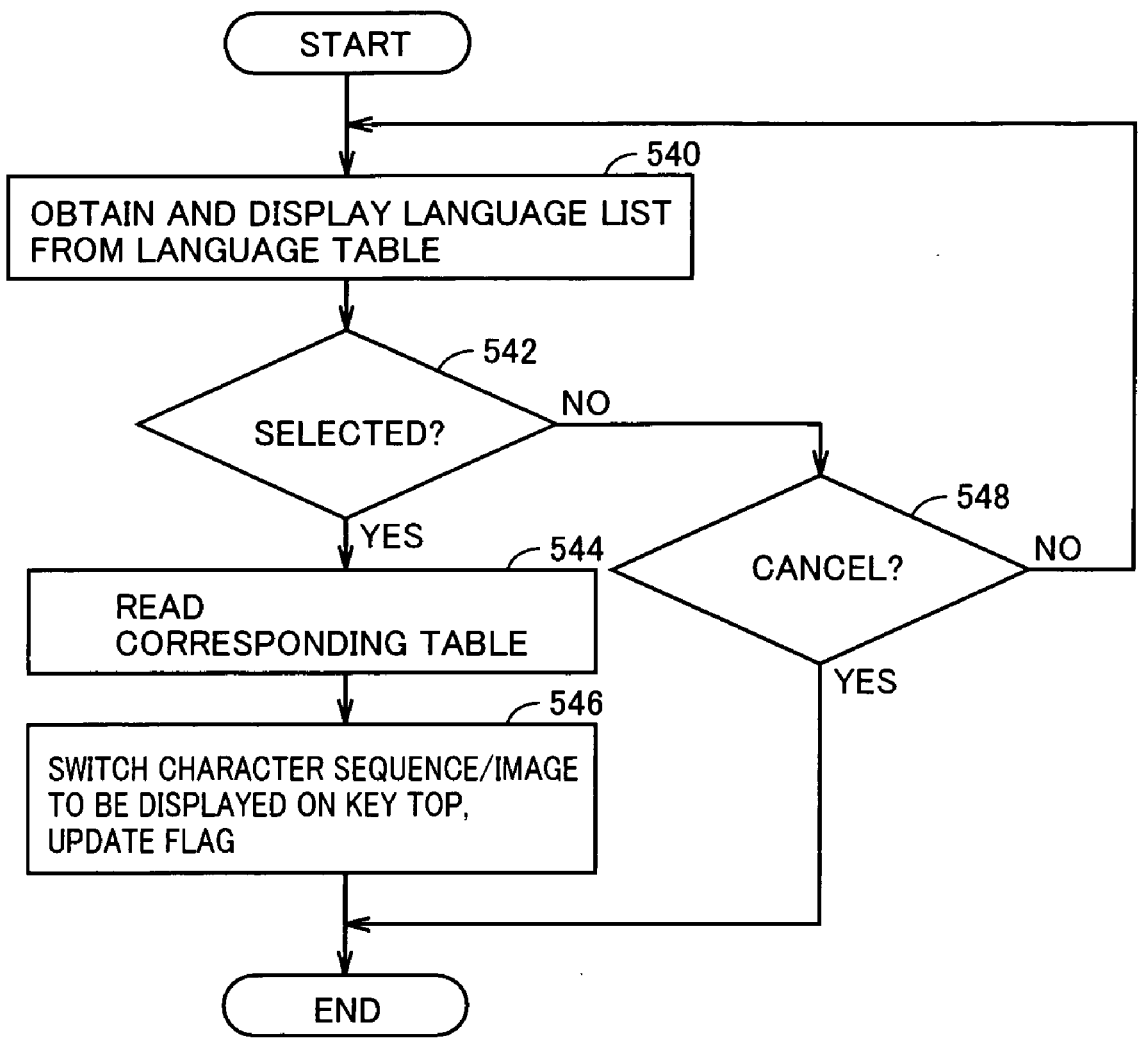
FIG. 15 is a flowchart representing a control structure of a computer program for selecting a language, executed when a custom setting key 338 is pressed.

In the following, a program for selecting a language executed by control unit 270 when custom setting key 338 is pressed, will be described. Referring to FIG. 15, the program includes: a step 540 of obtaining a language list from language table 520 and displaying it on display panel 172; following step 540, a step 542 of receiving a user input, determining whether or not the input corresponds to a language selecting operation, and branching the control flow depending on the result of determination; a step 544 executed in response to a determination at step 542 that a language selection is made by the user, of reading the character sequence table corresponding to the language; and, following step 544, a step 546 of displaying the corresponding character sequence on electronic paper corresponding to each key, in accordance with correspondence between key numbers and character sequences read at step 544, and updating, in language table 520, the flag of selected language to "1" and flags of other languages to "0", and ending the process. In the present embodiment, if a file name has been input for an image file and the file exists in the storage device, the image of the image file is displayed, and otherwise, a character sequence is displayed, at step 546.

The program further includes a step 548 executed in response to a determination that a key operation made at step 542 is not a language selecting operation, of determining whether or not the operated key corresponds to cancellation, and cancelling the process if it is, and otherwise returning the control to step 540.

In normal key display, the process corresponding to steps 544 and 546 may be executed. Here, prior to step 544, it is necessary to execute a process of determining the language of which flag is "1" in language table 520. If flags of all languages are "0", the language at the top of the list is used as a default.

Referring to FIGS. 1 to 8, image forming apparatus 150 in accordance with the present embodiment having the structure described above operates as follows.

First, the user activates image forming apparatus 150. After activation, control unit 270 displays display data corresponding to a preset language (for example, Japanese), on sheets of electronic paper 350 to 368. Then, the user uses a common function of image forming apparatus, executed by image forming apparatus 150.

When the language is to be changed, the user presses custom setting key 338, so that an image showing the language list allowing language selection is output on display panel 172 (step 540 of FIG. 15). The user selects a desired language (for example, English) from the language list (YES at step 542). Control unit 270 reads character sequence table 524 corresponding to English, and displays the character sequences or images such as icons determined by the table on sheets of electronic paper 350 to 368.

Thereafter, the user sets a desired function or determines the state of image forming apparatus, based on the character sequences displayed in English on the electronic paper.

Assume that the user turned off the power of image forming apparatus 150. Even while the power is off, data that have been displayed before power off are kept displayed on sheets of electronic paper 350 to 368. Therefore, the image forming apparatus can be used in the same state as when character sequences are printed on the operation panel in the language used by the user.

It is desirable that character sequences on the right side of LEDs 340 and 342 and 344 and 346 on operation panel 170 are also provided on sheets of electronic paper to allow switching of language, as in the third embodiment described later.

As is apparent from the foregoing description, by using image forming apparatus 150 in accordance with the present embodiment, the data displayed on sheets of electronic paper 350 to 368 of image forming apparatus 150 can freely be changed to data corresponding to a language desired by the user. For instance, assume that image forming apparatus 150 is marketed in a country having a plurality of official languages, for example, in Canada. The buyer need not worry in what language the descriptions are written on the operating device of image forming apparatus, when he/she buys the apparatus. Further, it is unnecessary to change the image forming apparatus having descriptions written in a language different from the language desired by the user.

Second Embodiment

In the first embodiment, only the language of the character sequences displayed on the electronic paper is switched. If the electronic paper is provided on the operation panel, however, it is desired that the display on the electronic paper is changed when functions allocated to various hard keys are changed, in addition to the simple switching of language. Thus, it becomes unnecessary to change the character sequences that are fixedly printed on key tops, while the functions of the image forming apparatus can be enhanced and the confusion of the user in operation can be avoided The image forming apparatus in accordance with the second embodiment described in the following has such a function. The appearance and hardware configuration of the image forming apparatus in accordance with the present embodiment are substantially the same as those of image forming apparatus 150 in accordance with the first embodiment. The apparatus, however, is different from image forming apparatus 150 in accordance with the first embodiment in that it includes an operation panel 400 shown in FIG. 10 in place of operation panel 170 shown in FIGS. 6 to 9, and a control unit capable of control for changing function of each key on operation panel 400, in place of control unit 270.

<Appearance of Operation Panel 400>

Figure 10:
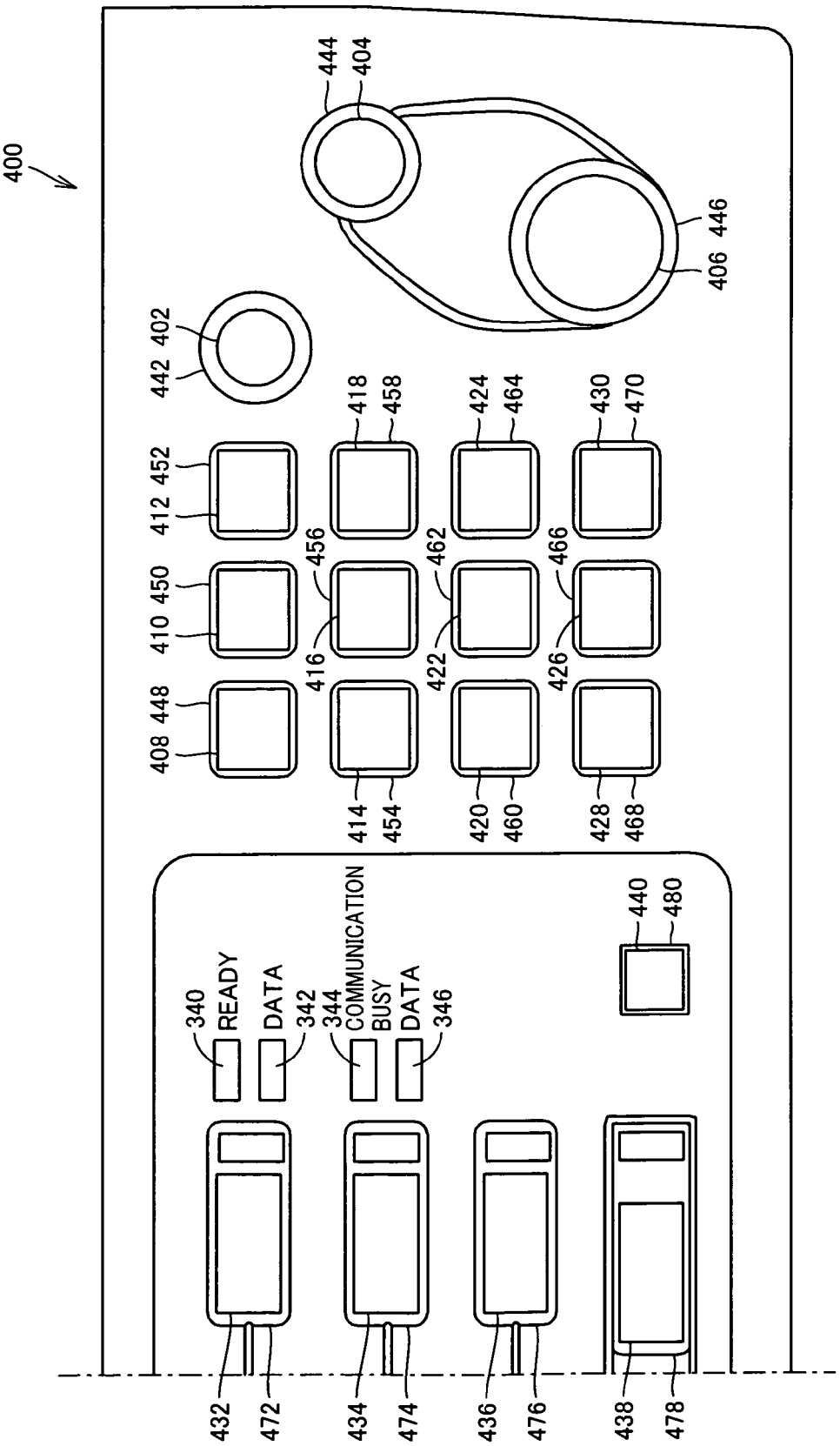
FIG. 10 is a plan view of a right half of an operation panel 400 included in an image forming apparatus in accordance with a second embodiment of the present invention.

Referring to FIG. 10, operation panel 400 includes keys 442 to 480 and LEDs 340 to 346. These correspond to keys 304, 302, 300 and 306 to 336 shown, for example, in FIG. 7. Operation panel 400 further includes sheets of electronic paper 402 to 440 arranged on the top surfaces of keys 442 to 480.

In the present embodiment, in RAM 274 or the like, functions and corresponding images are stored in advance. Further, RAM 274 stores information indicating which function is allocated to which key. The control unit determines which character sequence or which image is to be displayed on the key top of which key, based on the information indicating which function is allocated to which key, and displays these images on sheets of electronic paper 402 to 440.

Exemplary character sequences displayed on the sheets of electronic paper 402 to 440 include "CLEAR", "ALL CLEAR", "START", "0" to "9", "*" "#/F", "PRINT MODE", "FACSIMILE MODE", "COPY MODE", "JOB STATUS" and "CUSTOM SETTING."

The user can designate which function is to be allocated to which key. In accordance with the designation, displays of electronic paper on key tops of various keys are switched. At this time, the user does the work of relating an image representing each key to the character sequence (character sequence to be displayed on key top or the like) representing the function to be allocated to each key. Specifically, when a character sequence to be displayed on each key is selected, the corresponding function comes to be displayed on the key top.

Figure 11:
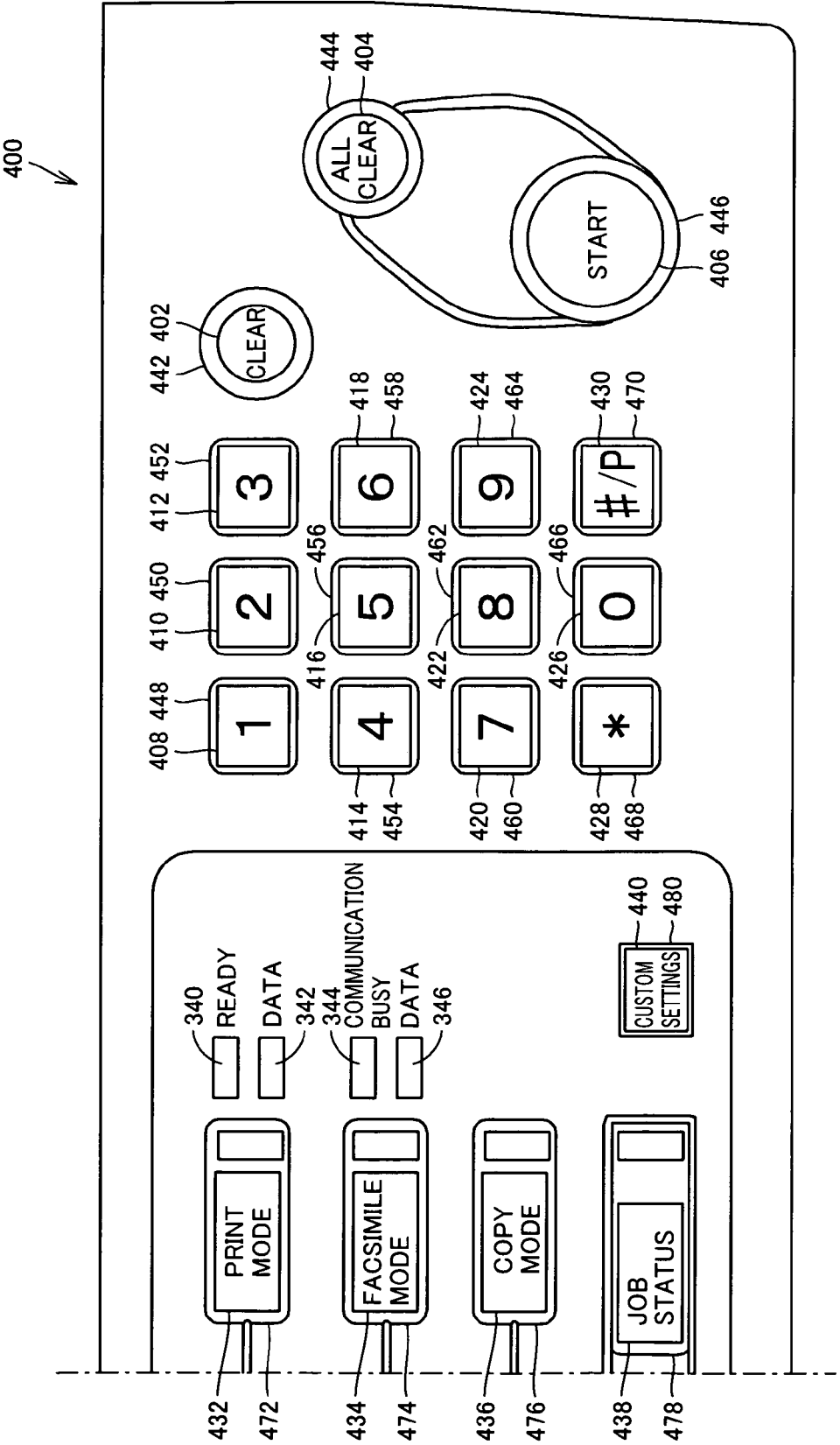
FIG. 11 is a plan view of a right half of operation panel 400.

When character sequences or images in accordance with default function allocation are displayed on sheets of electronic paper 402 to 440, the arrangement on the right half of operation panel 400 is as shown in FIG. 11. Referring to FIG. 11, it is naturally understood that functions corresponding to the function names displayed on the key tops are allocated to corresponding keys.

Figure 16:
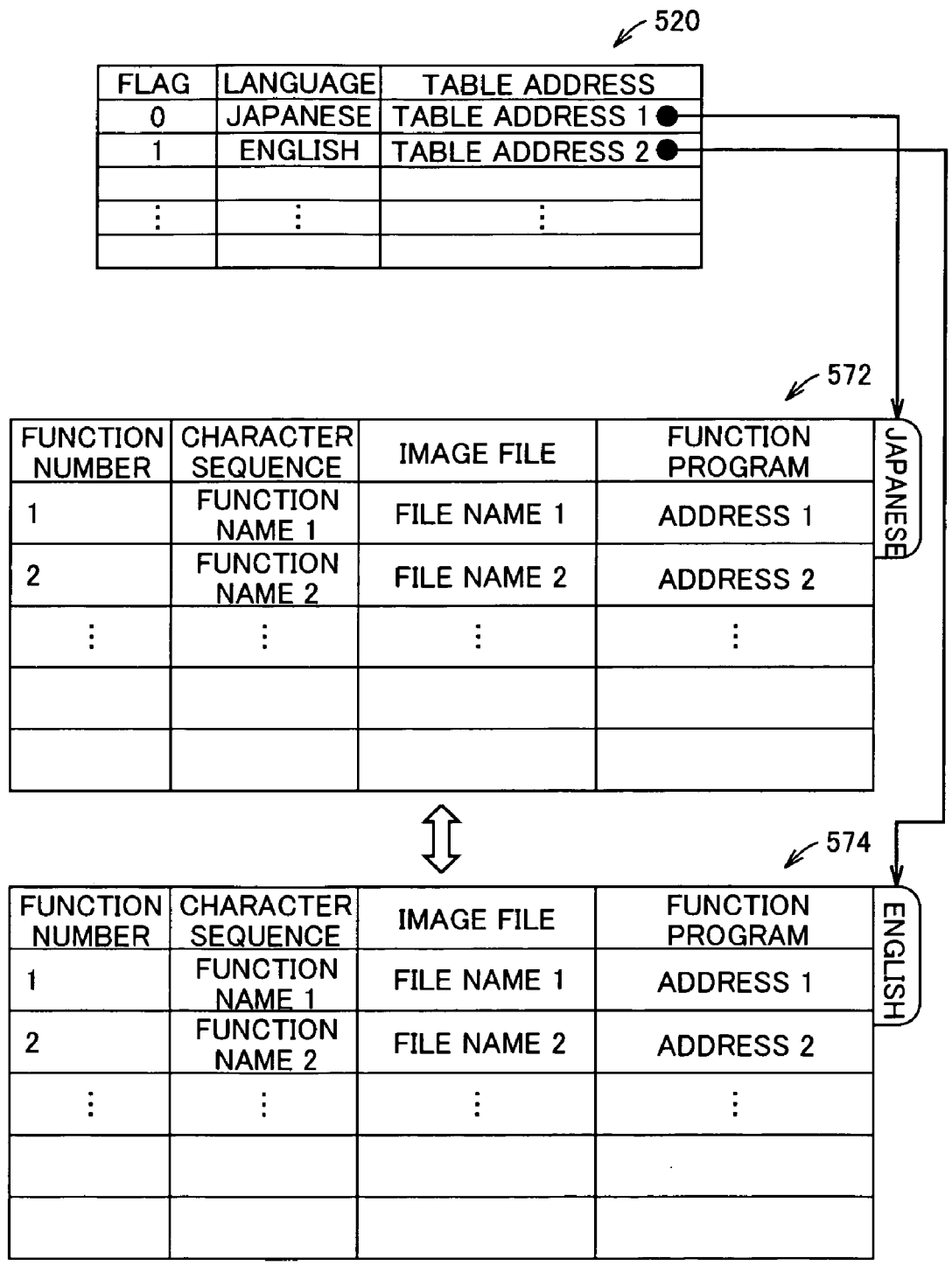
FIG. 16 illustrates data structure necessary for switching language of character sequences to be displayed on an electronic paper and on the display panel.

In the image forming apparatus in accordance with the present embodiment, data necessary for switching the language of character sequences to be displayed on the electronic paper and display panel are stored in the form of a table shown in FIG. 16, in ROM 272.

Referring to FIG. 16, the data includes a language table 520 used in the present embodiment, and character sequence tables 572 and 574 having substantially the same configurations as character sequence tables 522 and 524 in accordance with the first embodiment. The data further includes a correspondence table 580 shown in FIG. 17, defining correspondence between the keys and functions used in the present embodiment.

Character sequence table 572 shown in FIG. 16 is different from character sequence table 522 shown in FIG. 14 in that in place of the field "KEY NUMBER" of FIG. 14, it includes a field of "FUNCTION NUMBER." It is noted, however, that here again, the function numbers and corresponding function names mean substantially the same in character sequence tables 572 and 574, though in different languages.

Figure 17:
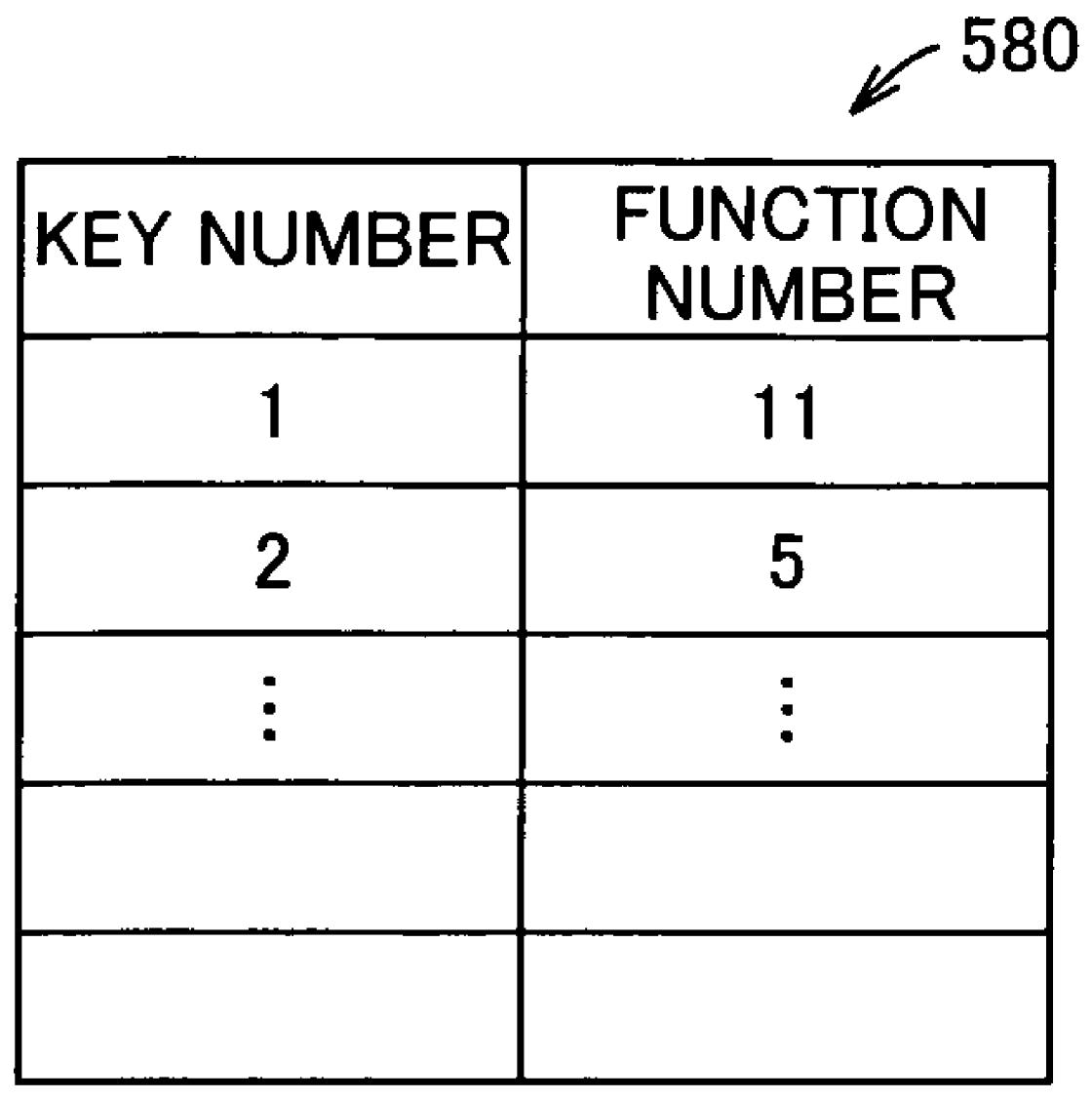

Correspondence table 580 shown in FIG. 17 indicates correspondence between key numbers and function numbers. By rewriting the contents of "function number" field of correspondence table 580, allocation of which function to which key is determined. When the function is determined, the character sequence or icon to be displayed on the key is determined, for example, from character sequence table 572 shown in FIG. 16.

Figure 24:
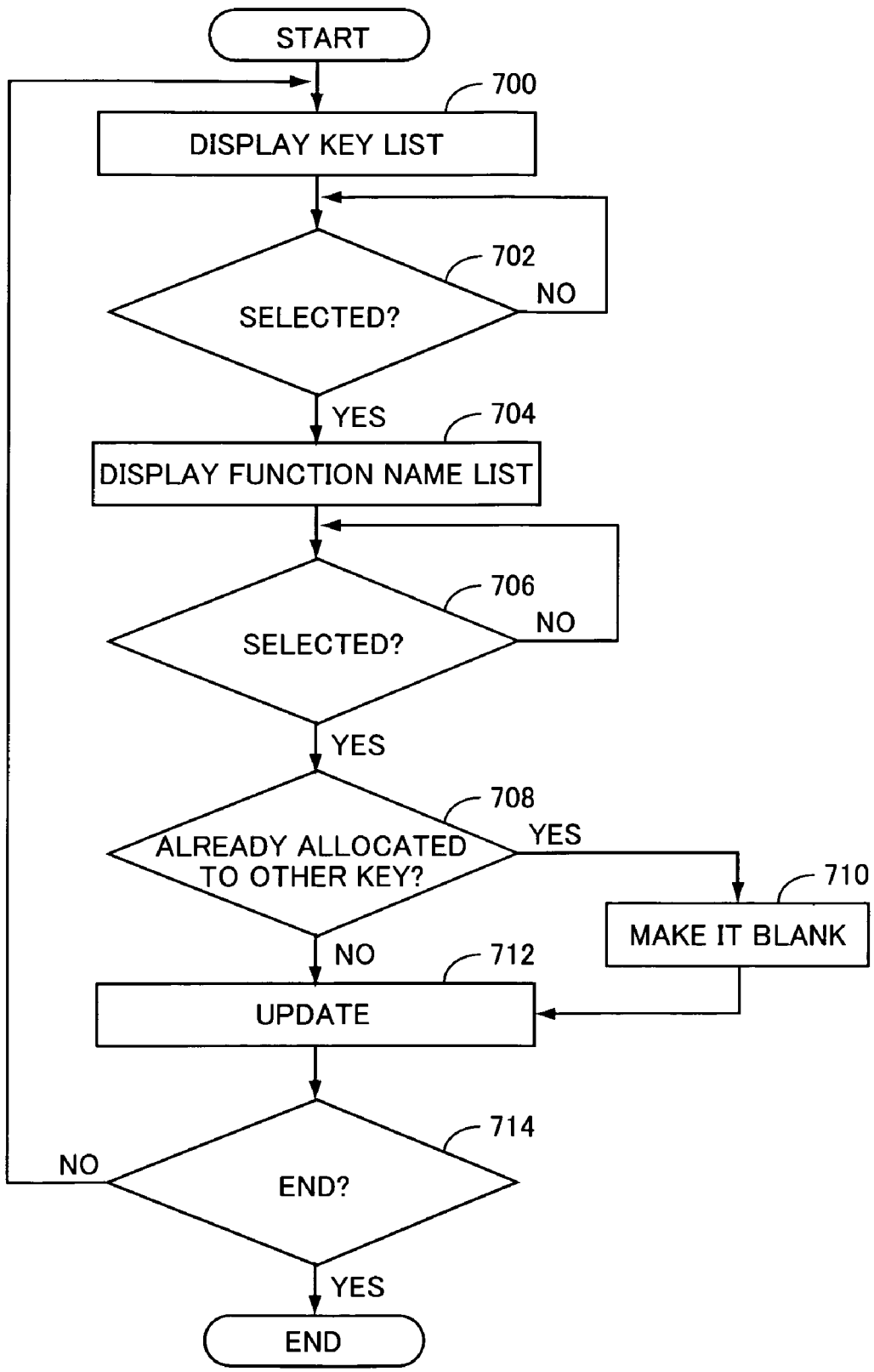
FIG. 24 is a flowchart representing a control structure of a computer program for allocating a function to each key, executed by a control unit of the image forming apparatus in accordance with the second embodiment.

The software configuration allowing the user to select a language is substantially the same as the software configuration described in the first embodiment. In the following, a key function allocating program, which is executed by the control unit in accordance with the present embodiment, allowing the user to update the function number key by key will be described. Referring to FIG. 24, the program is activated in response to a user operation requesting updating of function number. The program includes: a step 700 of displaying, after activation, a list of key numbers stored in correspondence table 580 on display panel 172; a step 702, following step 700, of waiting until any of the key numbers is selected by a user operation of display panel 172; a step 704 of displaying, when any of the key numbers is selected by the user at step 702, a list of function names of the currently used character sequence table on display panel 172; and a step 706, following step 704, of waiting until any of the function names is selected by a user operation of display panel 172.

In the following, the key number selected at step 702 and the function name selected at step 706 will be referred to as "selected key number" and "selected function name", respectively.

The program further includes: a step 708 of determining, when any of the function names is selected by the user at step 706, whether there is a key number corresponding to the selected function name (hereinafter referred to as "prior correspondence key number") other than the selected key number in the correspondence table 580, and branching the control flow depending on the result of determination; a step 710 of making blank the function number that corresponds to the prior correspondence key number in correspondence table 580, if the prior correspondence key number exists at step 708; and a step 712 executed after step 710 if the prior correspondence key number exists at step 708 and executed after step 708 if the prior correspondence key number does not exist at step 708, of updating the function number corresponding to the selected key number with the function number corresponding to the selected function name, in correspondence table 580.

The number of keys is limited, while the number of functions may be larger than the number of keys. Therefore, it is desirable to allocate one function to one key and not to a plurality of keys. Steps 708 to 712 ensure that only one function is allocated to only one key and not to a plurality of keys.

At step 712, the function number corresponding to the selected key number is updated and, as a result, the image or character sequence corresponding to the function number comes to be displayed on the corresponding sheet of electronic paper. Further, if the user operates the said selected key thereafter, the image forming apparatus executes the function corresponding to the function number.

The program further includes a step 714, following step 712, of determining whether or not end of key function allocating program is requested by a user operation, and branching the control flow depending on the result of determination.

If the end of program is not requested at step 714, control returns to step 700. If the end of program is requested at step 714, the program ends.

It is apparent that language can be switched in the same manner as in the first embodiment, even when the language table 520, character sequence tables 572 and 574 and correspondence table 580 having the structures shown in FIGS. 16 and 17 are used.

<Operation>

The image forming apparatus in accordance with the present embodiment having the above-described structure operates as follows.

The operation allowing the user to select a language is the same as that of the first embodiment.

In the following, the operation allowing the user to update the function number for each key will be described.

Assume that the user operates the image forming apparatus in accordance with the present embodiment and requests update of function number.

In response to the request, the image forming apparatus displays the key number list on operation panel 172 (step 700 shown in FIG. 24), and waits until any of the key numbers is selected by the user (step 702 of FIG. 24).

The user selects, by operating display panel 172, a key number of which function is to be updated.

The image forming apparatus displays a list of functions of currently used character sequence table on display panel 172 (step 704 shown in FIG. 24).

The user selects, by operating display panel 172, a function name to be allocated to the selected key number.

The image forming apparatus determines whether there is any key number (prior correspondence key number) that corresponds to the selected function name other than the selected key number in correspondence table 580 (step 708 shown in FIG. 24).

If there is any prior correspondence key number found at step 708, the image forming apparatus makes blank the function number that corresponds to the prior correspondence key number of the correspondence table 580 (step 710 shown in FIG. 24), and updates the function number corresponding to the selected key number to the function number related to the selected function name (step 712 shown in FIG. 24).

If there is no prior correspondence key number at step 708, the image forming apparatus executes only the process (step 712 shown in FIG. 24) of updating the function number corresponding to the selected key number to the function number related to the selected function name.

Until the end of key function allocating program is requested by the user, the image forming apparatus repeatedly executes the process of steps 700 to 712.

As is apparent from the description above, by using the image forming apparatus of the present embodiment, it is possible for the user to change the function allocated to each key to be convenient for use by the user. In that case, the display on each key top is automatically changed to the character sequence or image indicating the function. As a result, an image forming apparatus very convenient for use by the purchaser can be realized.

By combining the function with the function of switching the language, it is possible to change the data displayed on sheets of electronic paper 402 to 440 to any language other than Japanese. In that case, what is necessary is simply to prepare a number of tables representing correspondence between functions and corresponding images in different languages and to appropriately switch the tables. Pictures or photographs that are associated with respective functions may be used in place of the character sequences.

Third Embodiment

The appearance and hardware configuration of image forming apparatus in accordance with the present embodiment are substantially the same as those of image forming apparatus 150 in accordance with the first embodiment, while the apparatus is different from image forming apparatus 150 in that in place of operation panel 170, it includes an operation panel 500 shown in FIG. 11.

<Appearance of Operation Panel 500>

Figure 12:
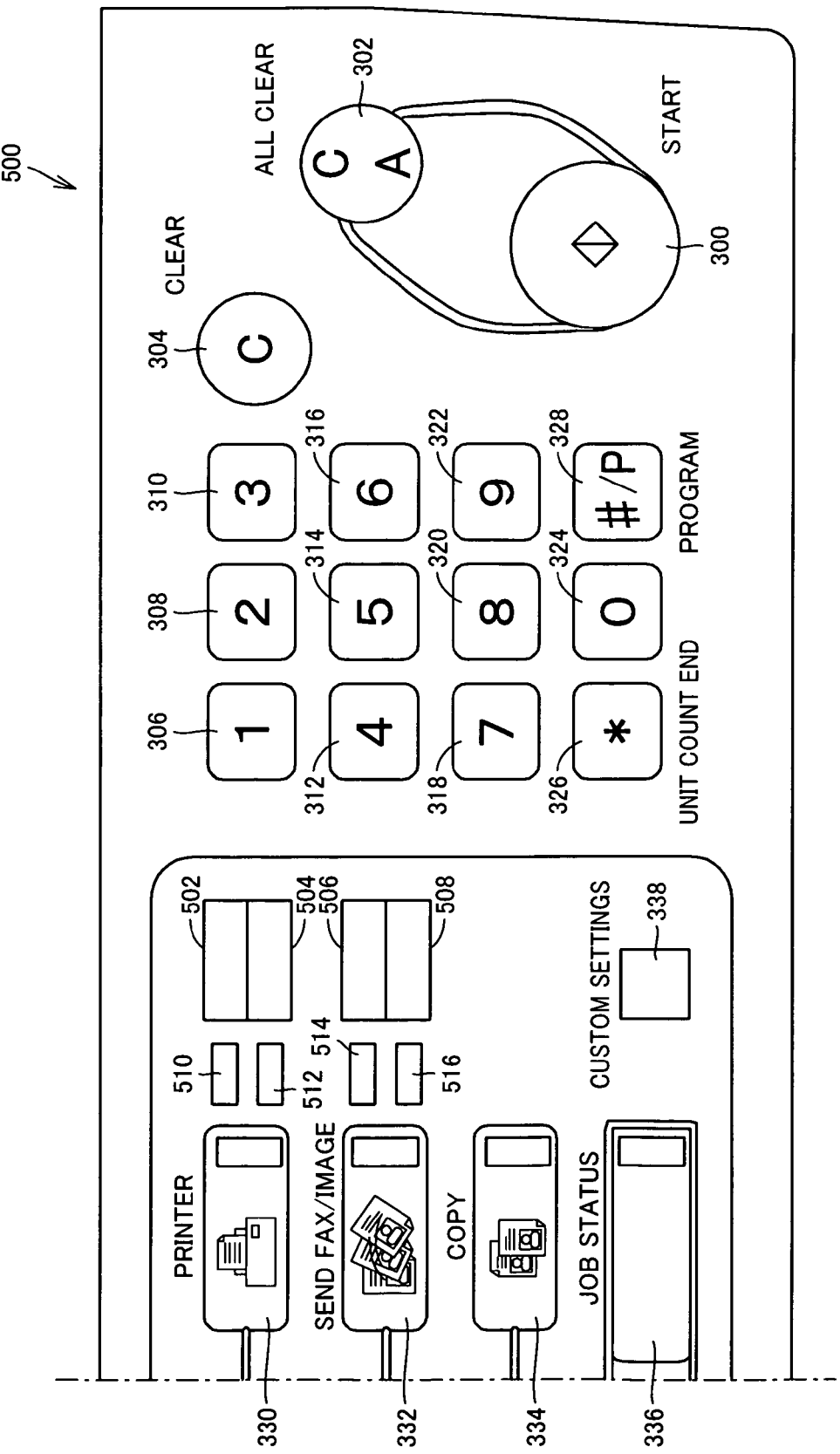
FIG. 12 is a plan view of a right half of an operation panel 500 included in an image forming apparatus in accordance with a third embodiment of the present invention.

Referring to FIG. 12, operation panel 500 is different from that of image forming apparatus 150 of the first embodiment in that it additionally includes four sheets of electronic paper 502, 504, 506 and 508 arranged on the right side of LEDs 510, 512, 514 and 516, respectively.

In the following, the arrangement on the right half of operation panel 500 when character sequences or images are displayed in accordance with default function allocation on sheets of electronic paper 502 to 508 will be described.

Figure 13:
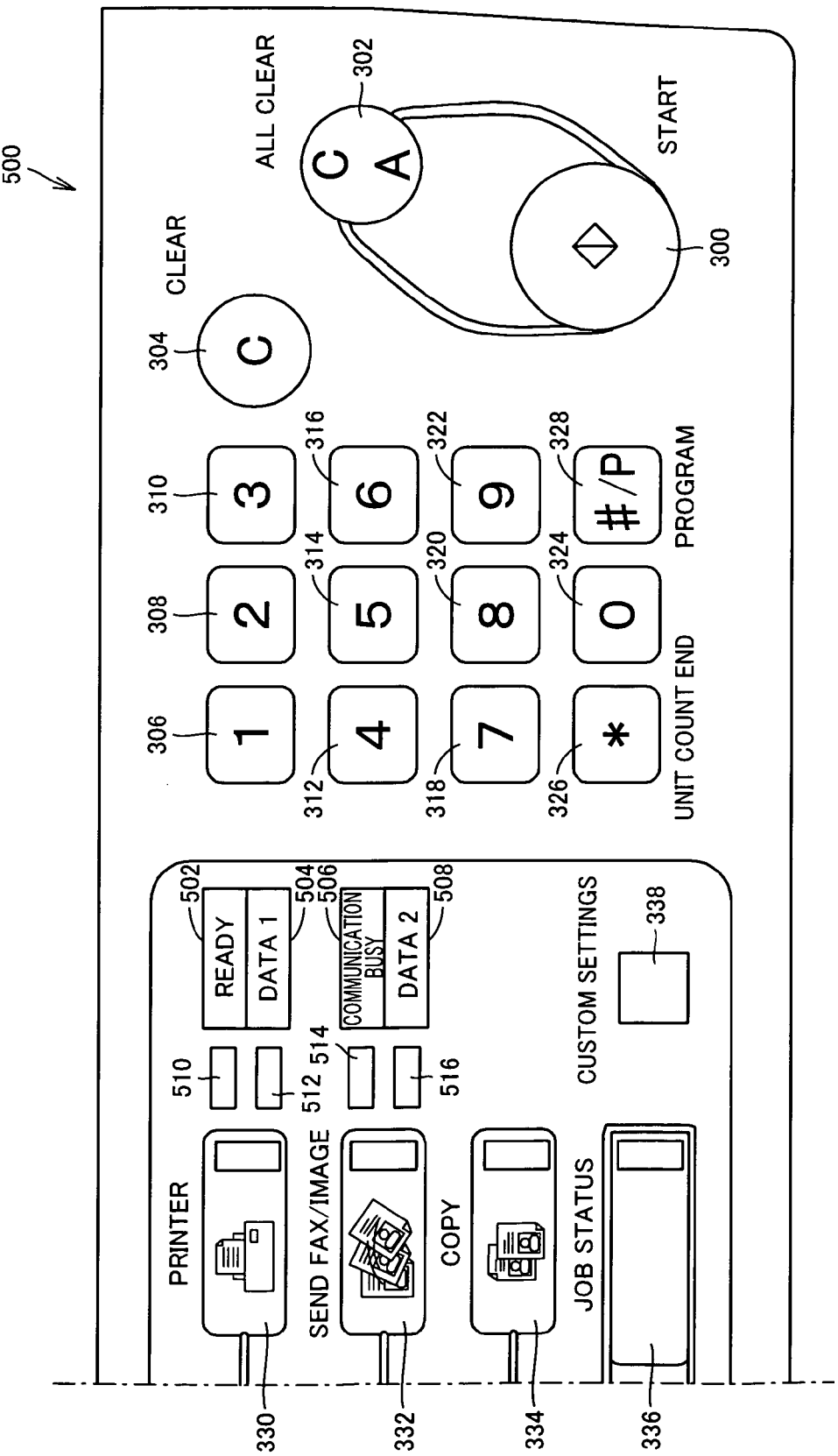
FIG. 13 is a plan view of a right half of operation panel 500.

Referring to FIG. 13, on these sheets of electronic paper, character sequences (for example, "READY" and "DATA") indicating on and off states allocated to the LEDs on the left side are displayed. As in the first and second embodiments, it is possible for the user to designate which character sequence is to be displayed on which sheet of electronic paper, among sheets of electronic paper 502 to 504. In this case, however, the character sequences must be character sequences appropriately selected in advance to represent the meaning of display allocated to each LED. Examples may be characters printed on the operation panel in the first embodiment.

As is apparent from the foregoing, when the image forming apparatus in accordance with the present invention is used, the display data displayed on the sheets of electronic paper 502 to 508 of the image forming apparatus can be changed to be more convenient for use by the user.

Fourth Embodiment

In the second embodiment, key images and a list of function names are displayed to allow the user to input which function name is to be associated to which key. It would be troublesome, however, if the images of all keys and the list of function names are displayed while the user wishes to switch functions of only a few keys. For instance, assume that there are 100 keys including 10 keys as "ten keys", and the user wishes to change only the arrangement of ten keys. If all keys and the list of function names are displayed in such a case, it would be troublesome and time-consuming for the user to look for the image of ten keys.

In such a situation, it is preferred to divide the keys into a plurality of groups beforehand, rather than displaying all keys and the list of function names. If a user wishes to switch functions of some keys in a certain group, the image forming apparatus first displays a list of key groups. The image forming apparatus allows the user to select one group from the displayed list. Then, image forming apparatus allows allocation of function to each key that belongs to the selected group.

For instance, all keys are divided into a group of ten keys and a group of keys for changing operation mode such as facsimile mode and copy mode. If the user wishes to allocate a function to each key, the image forming apparatus first displays a list of groups on the display panel. If the user wishes to change only the arrangement of ten keys, the user selects the group of ten keys from the list. Thereafter, the image forming apparatus displays the list of ten keys and the list of function names, to allow the user to select allocation of which function to which key.

The image forming apparatus in accordance with the fourth embodiment described in the following has such a function. The appearance and hardware configuration of the image forming apparatus in accordance with the present embodiment are substantially the same as those of the image forming apparatus in accordance with the second embodiment. The apparatus is different, however, in that it includes, in place of operation panel 400 shown in FIGS. 10 and 11, an operation panel 600 shown in FIG. 18, which allows division of all keys into groups in advance and allows a user operation of allocating functions group by group.

In the following, the arrangement of right half of operation panel 600 when character sequences or images are displayed in accordance with default function allocation on sheets of electronic paper 402 to 440 will be described.

Figure 18:
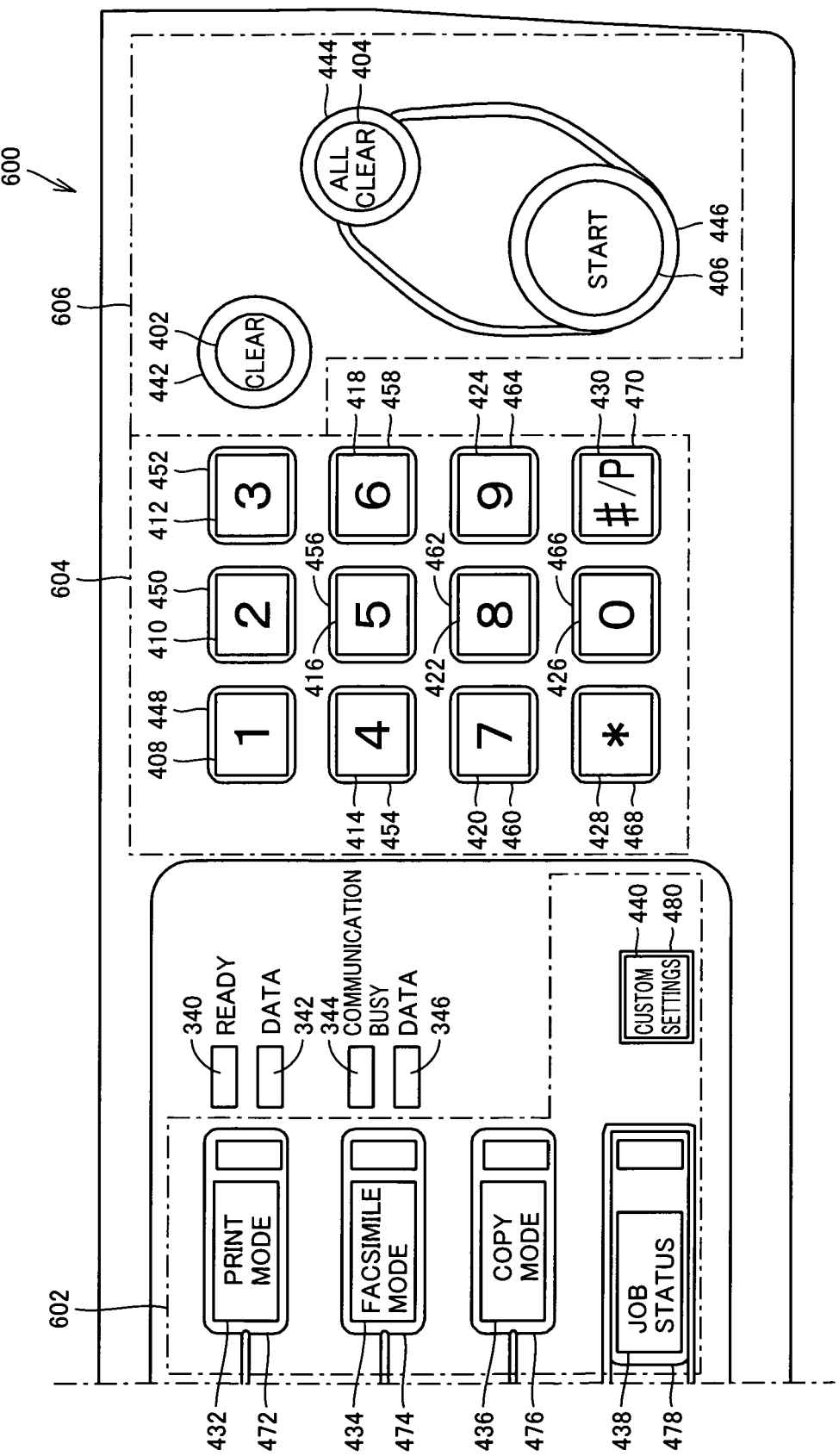
FIG. 18 is a plan view of a right half of an operation panel 600 included in an image forming apparatus in accordance with a fourth embodiment of the present invention.

Referring to FIG. 18, operation panel 600 includes: a group 602 including hard keys for changing the operational mode of image forming apparatus and a plurality of sheets of electronic paper formed close to the hard keys; a group 604 including hard keys as ten keys and a plurality of sheets of electronic paper formed close to the hard keys; and a group 606 including hard keys as start key, clear key and all clear key and a plurality of sheets of electronic paper formed close to respective hard keys. Operation panel 600 further includes LEDs 340 to 346.

Group 602 includes keys 472 to 480 and sheets of electronic paper 432 to 440 arranged on top surfaces of keys 472 to 480. Group 604 includes keys 448 to 470 and sheets of electronic paper 408 to 430 arranged on top surfaces of keys 448 to 470. Group 606 includes keys 442 to 446 and sheets of electronic paper 402 to 406 arranged on top surfaces of keys 442 to 446.

It is naturally understood that a function corresponding to the function name displayed on the key top is allocated to each key.

Figure 19:
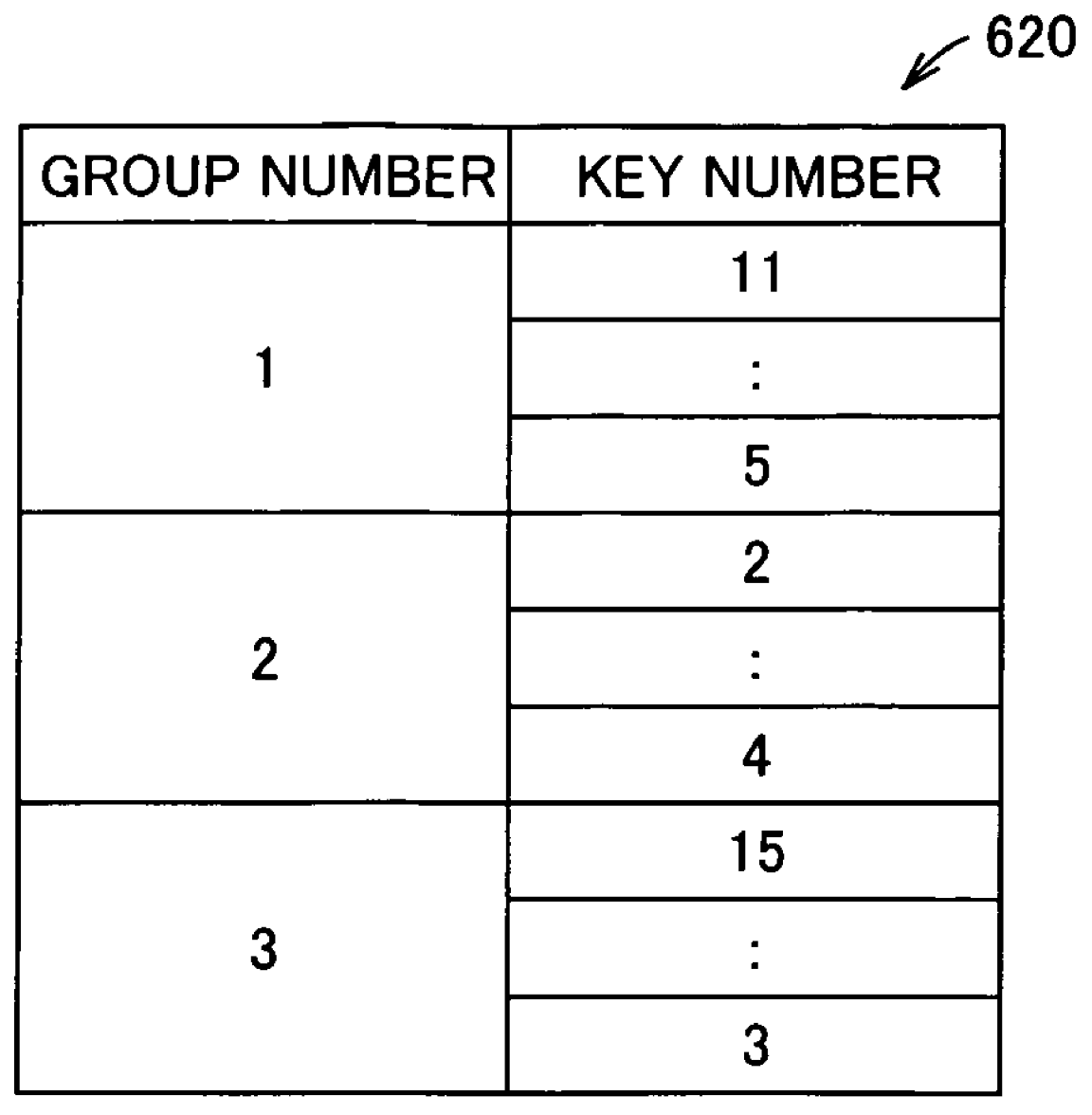

In the present embodiment, RAM 274 further stores information indicating which key belongs to which group. The information is stored in a correspondence table 602 shown in FIG. 19. In the following, the configuration of table 620 will be described. Referring to FIG. 19, the correspondence table 620 consists of a group number field storing numbers corresponding to groups 602 to 606, and a key number field storing key numbers belonging to each group.

In the following, the program executed by the control unit in accordance with the present embodiment allowing the user to allocate functions group by group will be described.

Figure 25:
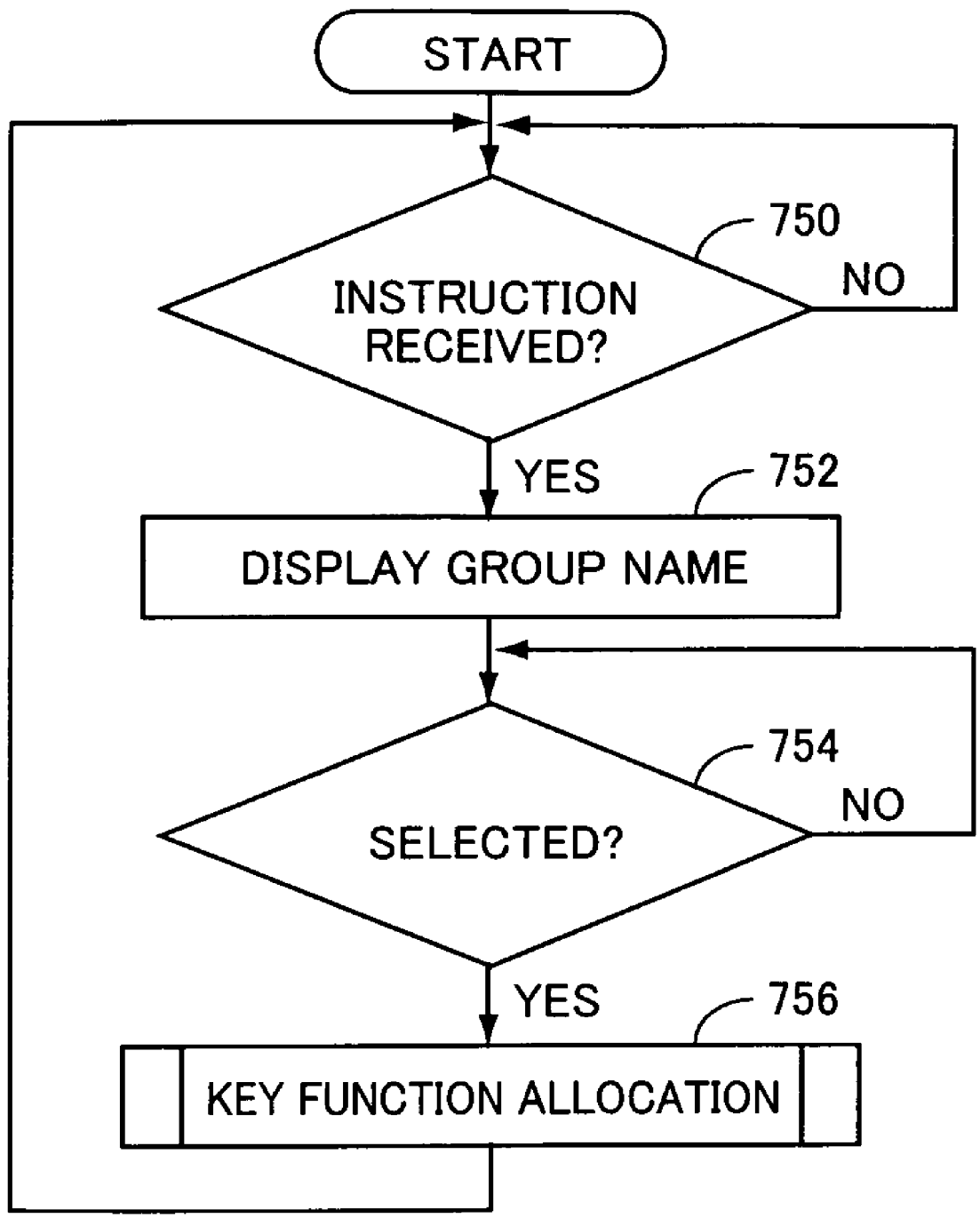
FIG. 25 is a flowchart representing a control structure of a computer program for allocating functions group by group, executed by a control unit of the image forming apparatus in accordance with the fourth embodiment.

Referring to FIG. 25, the program is activated when the power of image forming apparatus is turned on, and includes: a step 750 of waiting, after activation, until start of key function allocation is requested by a user operation; a step 752 of displaying, if the start of key function allocation is requested by the user operation at step 750, a list of group names stored in correspondence table 620 on display panel 172; and a step 754, following step 752, of waiting until any of the group names is selected by a user operation.

The program further includes a step 756 of executing, when a group name is selected at step 754, the program shown in FIG. 24 on each key that belongs to the selected group, and then returning control to step 750.

Different from the second embodiment in which functions are allocated to all keys, at step 756, functions are allocated only to the keys that belong to the group selected at step 754.

<Operation>

The image forming apparatus in accordance with the present embodiment having the above-described structure operates as follows.

The operation allowing the user to select a language is the same as that of the first embodiment.

In the following, the operation allowing the user to update the function number for each key will be described.

Assume that the user operates the image forming apparatus in accordance with the present embodiment and requests update of function number.

In response to the request (YES at step 750 shown in FIG. 25), the image forming apparatus displays a list of group names on display panel 172 (step 752 shown in FIG. 25). The user selects any of the group names, by operating display panel 172.

In response to selection of a group name by the user (step 754 shown in FIG. 25), the image forming apparatus executes a process of allocating a function to each key that belongs to the selected group, in the correspondence table 620 (step 756 shown in FIG. 25). The operation at step 756 is substantially the same as the operation of the second embodiment.

Figure 20:
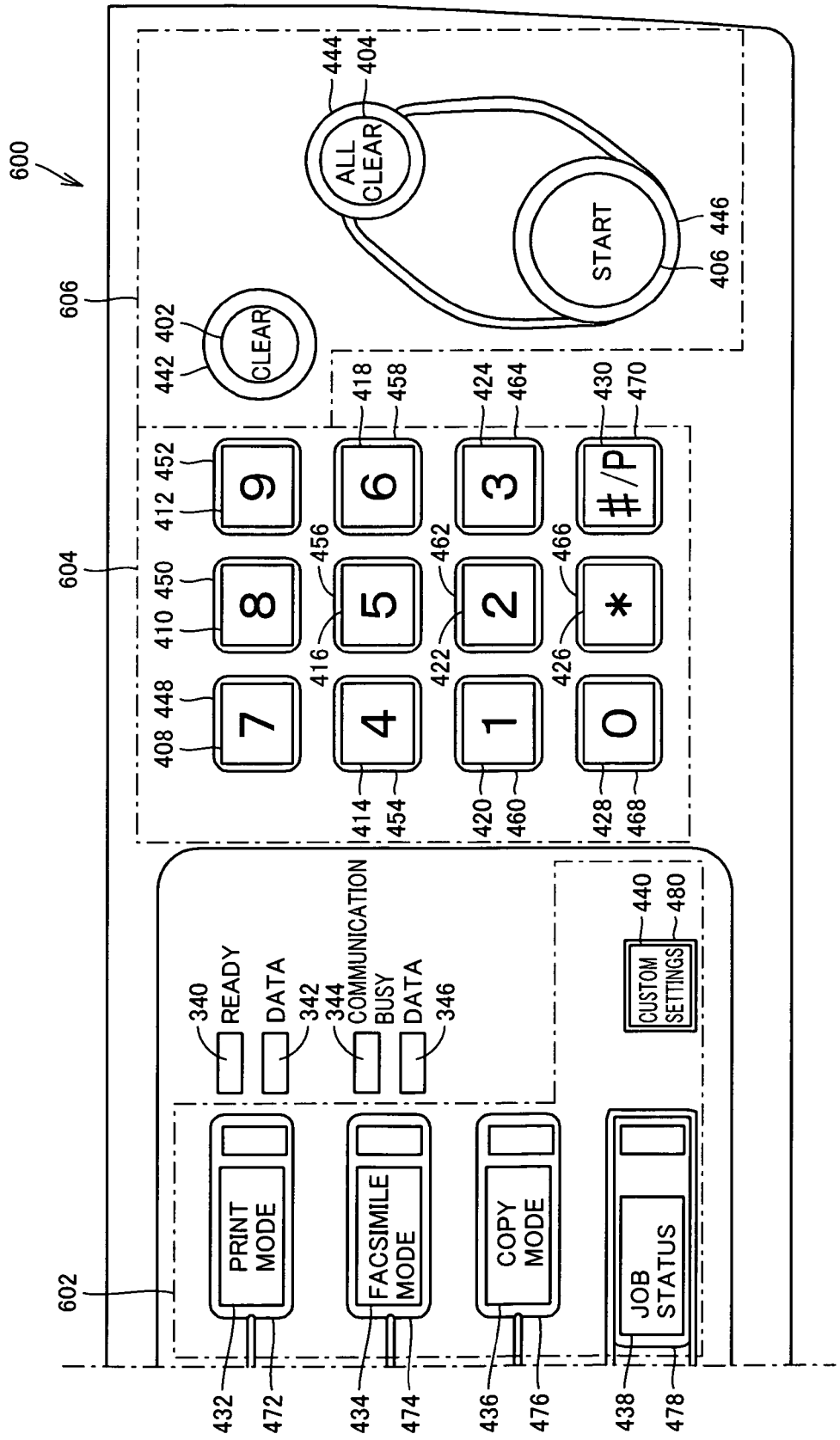
FIG. 20 shows operation panel 600 shown in FIG. 18, with ten-key arrangement switched.

FIG. 20 shows an example of changing function allocation to keys that belong to group 604.

As is apparent from the foregoing description, when the image forming apparatus in accordance with the present embodiment is used, it is possible for the user to change the functions allocated to various keys group by group to be convenient for the user. As a result, it becomes unnecessary for the user to set function allocation of each and every key, and the key arrangement can be changed to easy-to-operate arrangement simply by selecting a key group.

<Modification to Fourth Embodiment>

In the fourth embodiment described above, there are only three groups 602 to 606 on operation panel 600. The present invention, however, is not limited to such an embodiment. Operation panel 600 may further include an LED group including LEDs 340 to 346 and sheets of electronic paper arranged on the right side of respective LEDs. It may be possible to let the user select the LED group, and to switch the character sequence displayed on the electronic paper on the right side of each LED as in the third embodiment.

The fourth embodiment described above expects only the user who utilizes common functions of the image forming apparatus. The present invention, however, is not limited to such an embodiment. If a service person sets the image forming apparatus to a simulation mode for inspection and maintenance of the apparatus, it may be possible to display keys corresponding to simulation codes on sheets of electronic paper.

Fifth Embodiment

In the fourth embodiment, no matter who uses the image forming apparatus of the fourth embodiment, the functions allocated to various keys are common. However, what arrangement of key functions is convenient may differ user by user. Assume that a first user is a native Japanese speaker and a second user is a native English speaker. Assume that the first user sets displays of all sheets of electronic paper to Japanese, and ends use of the apparatus. If the second user wishes to use the image forming apparatus thereafter, it would be desirable for the second user to change the displays on electronic paper from Japanese to English. In such a case, the second user must change the display of all sheets of electronic paper one by one to English, which is troublesome and time-consuming for the second user. Therefore, it is desirable, when various users use the image forming apparatus, to have the electronic paper display character sequences or images with predetermined key function arrangements user by user, after authentication of the user by the image forming apparatus.

Figure 21:
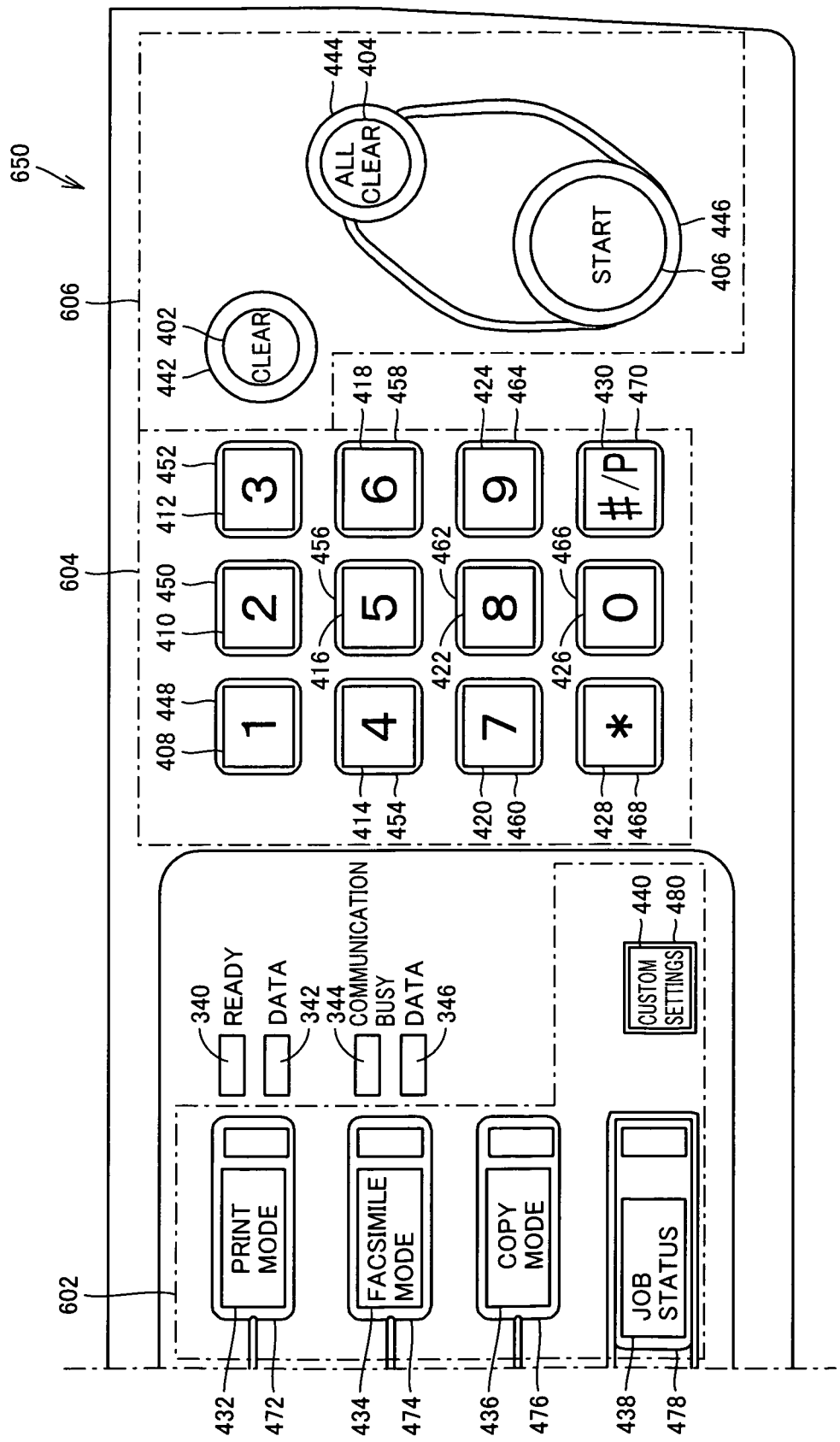
FIG. 21 is a plan view of a right half of an operation panel 650 included in an image forming apparatus in accordance with a fifth embodiment of the present invention.

The image forming apparatus in accordance with the fifth embodiment described in the following has such a function. The appearance and hardware configuration of the image forming apparatus in accordance with the present embodiment are substantially the same as those of the image forming apparatus in accordance with the fourth embodiment, while the apparatus is different from the fourth embodiment in that it includes, in place of operation panel 600 in accordance with the fourth embodiment, an operation panel 650 shown in FIG. 21 that allows user-by-user allocation of function to each key.

<Appearance of Operation Panel 650>

In the following, the arrangement on the right half of operation panel 650 when character sequences or images are displayed in accordance with default function allocation on sheets of electronic paper 402 to 440 will be described. It is naturally understood that functions corresponding to the function names displayed on the key tops are allocated to corresponding keys.

In the present embodiment, RAM 274 stores language tables having the same configuration as language table 520 shown in FIG. 16, character sequence tables having the same configuration as character sequence tables 572 and 574, and key function correspondence tables having the same configuration as correspondence table 580 shown in FIG. 17, for respective users using the image forming apparatus of the present embodiment. RAM 274 further stores user IDs for identifying the users, and a user correspondence table 670 shown in FIG. 22 for storing the language table, character sequence table and key function correspondence table corresponding to each user ID.

Figure 22:
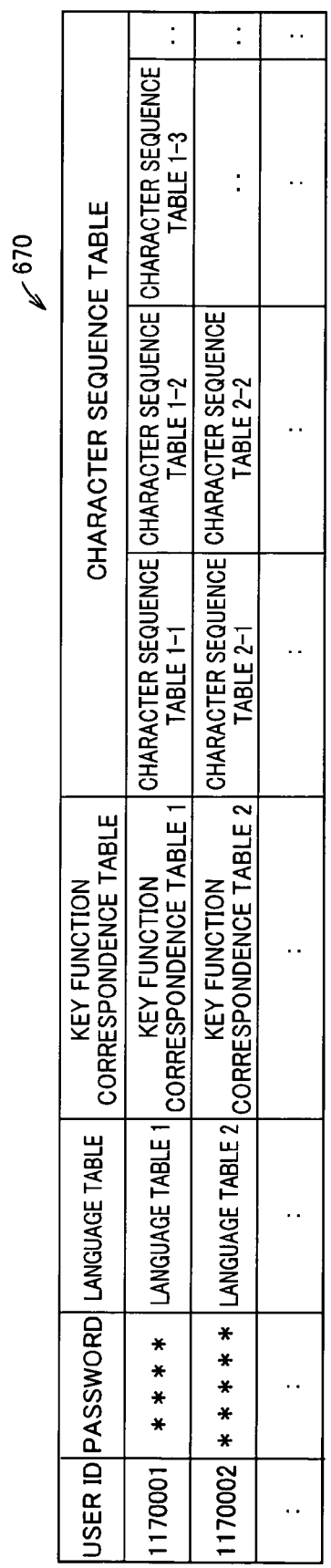
FIG. 22 shows correspondence between each of user IDs, language tables, key function correspondence tables and character sequence tables.

In the following, an exemplary configuration of user correspondence table will be described. Referring to FIG. 22, the user table consists of a user ID field for storing a user ID of each user, a password field for storing a password determined in advance by the user, and a language table field, a key function correspondence field and a character sequence table field for storing names of the language table, the key function correspondence table and the character sequence table allocated for the user, respectively.

In the following, a program executed by the control unit in accordance the present embodiment for allocating function to each key user by user will be described.

Figure 26:
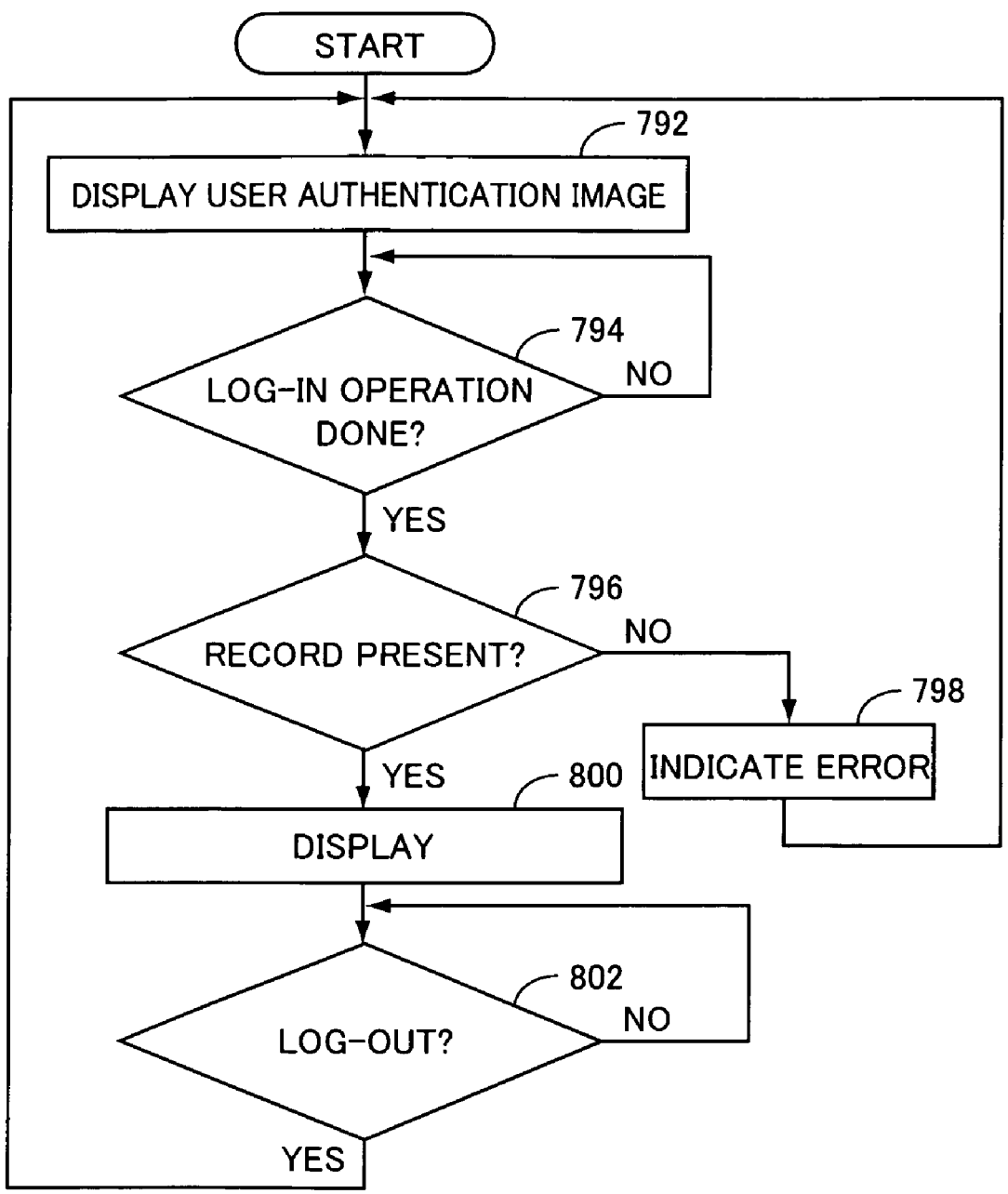
FIG. 26 is a flowchart representing a control structure executed by a control unit of the image forming apparatus in accordance with the fifth embodiment.

Referring to FIG. 26, the program is activated when the power of image forming apparatus is turned on, and includes a step 792 of displaying, after activation, a user authentication image asking the user to input user ID and password on display panel 172.

If the user wishes to start use of the image forming apparatus, he/she operates operating device 166, and thereby inputs his/her user ID and the password.

The program further includes: a step 794, following step 792, of waiting until the user ID and the password are input by the user and a log-in operation is done; and a step 796 of determining, if the log-in operation is done at step 794, whether a record matching the user ID and the password exists in the user correspondence table 670, and branching the control flow depending on the result of determination.

The program further includes; a step 798 of displaying, if it is determined at step 796 that the corresponding record does not exist in user correspondence table 670, a log-in failure message on display panel 172 and returning the control to step 792; a step 800 of displaying, if it is determined at step 796 that the corresponding record exists at user correspondence table 670, character sequences or images on sheets of electronic paper 402 to 440 in accordance with the language table, key function correspondence table and various character sequence tables that correspond to the record; and a step 802, following step 800, of waiting for a user log-out and after the log-out, returning the control to step 792.

After step 800, until the log-out, the control unit in accordance with the present embodiment may execute the program shown in FIGS. 15, 24 and 25.

<Operation>

The image forming apparatus in accordance with the present embodiment having the structure described above operates as follows.

When the power of image forming apparatus is turned on, the user authentication image is displayed on display panel 172 (step 792 shown in FIG. 26).

When the user starts using the image forming apparatus, he/she inputs his/her user ID and the password to the user authentication image to log-in.

In response to the operation (YES at step 794 shown in FIG. 26), the image forming apparatus determines whether a record that matches the input user ID and the password exists in user correspondence table 670 or not (step 796 shown in FIG. 26).

If there is no record that matches the input user ID and the password (NO at step 796 shown in FIG. 26), the image forming apparatus displays a log-in failure message on display panel 172 (step 798 shown in FIG. 26), and displays the user authentication image on display panel 172.

If there is a record that matches the input user ID and the password at step 796 (YES at step 796 shown in FIG. 26), the image forming apparatus displays character sequences or images on sheets of electronic paper 402 to 440 in accordance with the language table, key function correspondence table and character sequence table that correspond to the record (step 800 shown in FIG. 26). Then, the image forming apparatus waits until the user logs out (step 802 shown in FIG. 26).

Thereafter, the user can freely use the image forming apparatus.

The operation after step 800 until the log-out is the same as that of image forming apparatus in accordance with the first to fourth embodiments.

If the user logs out, the determination at step 802 shown in FIG. 26 is YES and, therefore, the image forming apparatus performs the process from step 792.

As is apparent from the description above, when the image forming apparatus in accordance with the present embodiment is used, it is possible for the user to change, user by user, the functions allocated to various keys to be convenient for the user. As a result, if the user allocates functions key by key and register the allocations beforehand, the key arrangement can be changed to the one convenient for the user, simply by selecting the user, without the necessity of key setting every time the user uses the image forming apparatus.

Sixth Embodiment

In the first to fifth embodiments, images related to key functions are displayed on all sheets of electronic paper arranged close to the keys. If there is some function that is unavailable by the image forming apparatus and the related character sequence or image is displayed on the electronic paper, such display would confuse the user. By way of example, assume that the image forming apparatus cannot operate in the printer mode as it is subjected to maintenance, while character sequence or image related to printer mode is displayed on a sheet of electronic paper formed close to a key for switching to the printer mode. In such a situation, the user could erroneously suppose that the image forming apparatus can operate in the printer mode and press the key to switch to the printer mode and, as the operation will not be switched to the printer mode, he/she would be confused. Therefore, if there is any function that is not available on the image forming apparatus, it is desirable to erase the image related to the function from the electronic paper.

The image forming apparatus in accordance with the sixth embodiment described in the following has such a function. The appearance and hardware configuration of the image forming apparatus in accordance with the present embodiment are substantially the same as those of the image forming apparatus in accordance with the fifth embodiment, while the apparatus is different from the image forming apparatus in accordance with the fifth embodiment in that it includes, in place of operation panel 650 of the fifth embodiment, an operation panel 680 shown in FIG. 23 controlled such that if there is any function unavailable on the image forming apparatus, the image related to the function is not displayed on the electronic paper.

<Appearance of Operation Panel 680>

In the following, the arrangement on the right half of operation panel 680 when character sequences or images are displayed in accordance with default function allocation on sheets of electronic paper 402 to 440 will be described. It is naturally understood that functions corresponding to the function names displayed on the key tops are allocated to corresponding keys.

Figure 23:
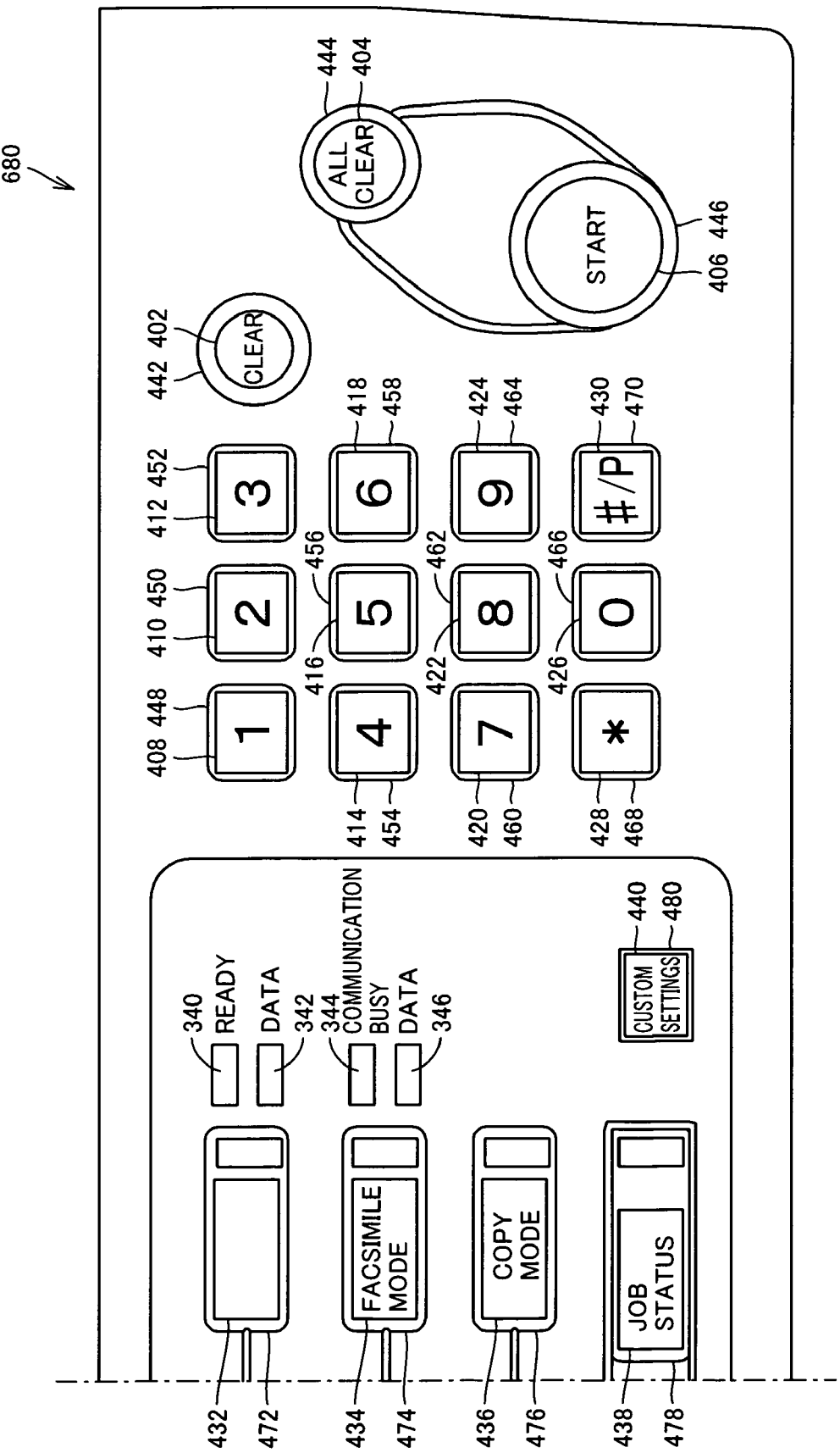
FIG. 23 is a plan view of a right half of an operation panel 680 included in an image forming apparatus in accordance with a sixth embodiment of the present invention.

Referring to FIG. 23, if a printer board is not mounted on the image forming apparatus in accordance with the present embodiment, control unit 270 controls the display such that the display on electronic paper 432 arranged close to printer mode key 472 is erased.

If the printer board is mounted on image forming apparatus 150, control unit 270 detects mounting of the printer board, and displays an image related to the printer mode on electronic paper 432 that corresponds to printer mode key 472, as shown in FIG. 11.

As is apparent from the description above, the image forming apparatus in accordance with the present embodiment will reduce erroneous operation of an unavailable function by the user.

In the embodiment described above, the character sequence or image displayed on the electronic paper positioned close to a key is controlled. The present invention, however, is not limited to such an embodiment. It is desirable to arrange electronic paper on the right side of LEDs 340 and 342 and 344 and 346 on operation panel 680 as in the third embodiment, and to control display such that displayed contents may be erased depending on whether the printer mode and the facsimile mode are available.

Further, in the sixth embodiment described above, if printer mode operation is not available, the character sequence or image corresponding to the printer mode is erased from the electronic paper. The present invention, however, is not limited to such an embodiment. If the image forming apparatus cannot operate in the facsimile mode, the character sequence or image related to the facsimile mode may be erased from the electronic paper. If it is detected that telephone line 286 is not connected to modem 278, control unit 270 may control such that the image related to facsimile mode is erased from electronic paper 434 shown in FIG. 20.

[Modification]

In the embodiment above, the data displayed on sheets of electronic paper 502 to 508 are in Japanese. The present invention, however, is not limited to such an embodiment. The data displayed on sheets of electronic paper 502 to 508 may be in English, Chinese or any other language. Other than the character sequences, images such as pictures or photographs associated with respective functions may be used.

In the first to third embodiments described above, the operating device is provided on the image forming apparatus. The present invention, however, is not limited to such an embodiment. The operating device may be used provided on apparatuses having various functions, including a common telephone, a portable telephone and the like, other than the image forming apparatus.

In the first to third embodiments described above, electronic paper is arranged close to the keys or LEDs. The present invention, however, is not limited to such an embodiment. What is provided close to the keys and LEDs may be a volatile display device such as an LCD (Liquid Crystal Display), other than the non-volatile display device as represented by the electronic paper. In that case, however, the display disappears if the apparatus is turned off. If such an approach is undesirable in design, the power supply to such volatile display device should be maintained even when the power supply to the main apparatus is turned off. Further, even when the apparatus is in a power saving mode, the power supply to the operation panel should be maintained.

Further, in the first to third embodiments above, keys and LEDs are arranged on the operation panel. The present invention, however, is not limited to such an embodiment. What is arranged on the display panel may include a general hardware switch such as a toggle switch, a lever switch, a slide switch, a locker switch, a dip switch and a push switch.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An operating device for controlling an apparatus as an object of control, in accordance with an instruction by a user, comprising:
   a panel having a main surface;
   a hardware component provided on said main surface;
   a display device provided on said main surface or on said hardware component, in relation to said hardware component, allowing rewriting of displayed contents;
   a language switching device allowing an user to switch languages;
   a character sequence changing device coupled to said display device and said language switching device for changing, in response to switching of language by said language switching device, a character sequence displayed on said display device to a character sequence of the switched language; and
   a function switching device coupled to said hardware component and said character sequence changing device, for switching, in response to changing of a character sequence displayed on said display device by said character sequence changing device, a function allocated to the hardware component provided in relation to the display device of which character sequence has been changed, to a function corresponding to said character sequence.

2. The operating device according to claim 1, wherein said hardware component includes a hardware key.

3. The operating device according to claim 2, wherein said display device includes a display unit provided close to said hardware key on said main surface and allowing rewriting of displayed contents.

4. The operating device according to claim 2, wherein said display device includes a display unit provided on a key top of said hardware key and allowing rewriting of displayed contents.

5. The operating device according to claim 1, wherein said hardware component includes a state displaying component provided on said main surface, and having its state of display changed between a first display state and a second display state in response to a display signal.

6. The operating device according to claim 5, wherein said display device includes a display unit provided close to said state displaying component on said main surface and allowing rewriting of displayed contents.

7. The operating device according to claim 1, wherein said display device includes a non-volatile display device, provided in relation to said hardware component, on said main surface or on said hardware component.

8. The operating device according to claim 1, wherein said display device includes a character sequence display device provided in relation to said hardware component, on said main surface or on said hardware component, for displaying a character sequence.

9. The operating device according to claim 1, wherein said display device includes an image display device provided in relation to said hardware component, on said main surface or on said hardware component, for displaying an image.

10. The operating device according to claim 1, comprising:
    a plurality of said hardware components; and
    a plurality of display devices provided in relation to said plurality of hardware components, respectively;
    wherein:
    said character sequence changing device is coupled to said plurality of display devices; and
    said function switching device is coupled to said plurality of said hardware components and said character sequence changing device, and switches a function of that hardware component among said plurality of hardware components which is provided in relation to the display device of which the displayed character sequence has been changed by said character sequence changing device, among said plurality of display devices.

11. The operating device according to claim 10, wherein said function switching device includes a device coupled to said plurality of hardware components and said character sequence changing device for allocating a function to a hardware component which is provided in relation to the display device of which the displayed character sequence has been changed by said character sequence changing device, among said plurality of display devices, such that the function of the hardware component provided in relation to the said display device does not overlap with a function of a hardware component provided in relation to a display device different from the said display device.

12. The operating device according to claim 1, further comprising
    a plurality of said display devices; and
    a display control device coupled to said display devices for controlling displayed contents of said display devices such that character sequences are displayed in one same language on said display devices.

13. The operating device according to claim 1, further comprising
a switching device coupled to said display device, for switching, user by user, character sequence or image to be displayed on said display device.

14. The operating device according to claim 1, comprising a plurality of said display devices; wherein
said plurality of display devices are divided into a plurality of groups;
said operating device further comprising
a display switching device coupled to said plurality of display devices for switching, group by group, images displayed on said plurality of display devices, in accordance with a user operation.

15. The operating device according to claim 1, further comprising:
display switching means for switching an image displayed on said switching device, in accordance with a user operation;
wherein the function switching device switches, in response to switching of an image displayed on said display device by said display switching means, a function allocated to the hardware component provided in relation to the display device of which image has been switched, to a function corresponding to said image.

16. An image forming apparatus, comprising:
the operating device according to claim 1; and
a control device executing a prescribed process in response to an operation by a user of said operating device.

17. The image forming apparatus according to claim 1, further comprising
an image switching device coupled to said display device, for switching an image displayed on any of said display devices based on a mode in which said image forming apparatus can operate.

18. An operating device for controlling an apparatus as an object of control, in accordance with an instruction by a user, comprising:
a panel having a main surface;
a hardware component provided on said main surface;
a display device provided on said main surface or on said hardware component, in relation to said hardware component, allowing rewriting of displayed contents;
a language switching device allowing an user to switch languages;
a display switching device coupled to said display device and said language switching device, for switching, in response to switching of language by said language switching device, an image displayed on said display device; and
a function switching device coupled to said hardware component and said display switching device, for switching, in response to switching of an image displayed on said display device by said display switching device, a function allocated to the hardware component provided in relation to the display device of which image has been switched, to a function corresponding to said image.

* * * * *